(12) United States Patent
Kodama

(10) Patent No.: US 11,155,123 B2
(45) Date of Patent: *Oct. 26, 2021

(54) PNEUMATIC TIRE

(71) Applicant: The Yokohama Rubber Co., LTD., Tokyo (JP)

(72) Inventor: Yuji Kodama, Hiratsuka (JP)

(73) Assignee: The Yokohama Rubber Co., LTD.

(*) Notice: Subject to any disclaimer, the term of this patent is extended or adjusted under 35 U.S.C. 154(b) by 344 days.

This patent is subject to a terminal disclaimer.

(21) Appl. No.: 15/565,038

(22) PCT Filed: Apr. 8, 2016

(86) PCT No.: PCT/JP2016/061540
§ 371 (c)(1),
(2) Date: Oct. 6, 2017

(87) PCT Pub. No.: WO2016/163516
PCT Pub. Date: Oct. 13, 2016

(65) Prior Publication Data
US 2018/0099531 A1    Apr. 12, 2018

(30) Foreign Application Priority Data

Apr. 9, 2015  (JP) .............................. JP2015-080268

(51) Int. Cl.
*B60C 13/02* (2006.01)
*B60C 15/024* (2006.01)

(52) U.S. Cl.
CPC ............ *B60C 13/02* (2013.01); *B60C 15/024* (2013.01)

(58) Field of Classification Search
CPC ..... B60C 13/00; B60C 13/001; B60C 13/002; B60C 13/02; B60C 13/023; B60C 15/024
See application file for complete search history.

(56) References Cited

U.S. PATENT DOCUMENTS 9,387,730 B2 *   7/2016  Kodama ................. B60C 13/02
2009/0032161 A1   2/2009  Yamaguchi
(Continued)

FOREIGN PATENT DOCUMENTS

EP    2181865    *   5/2010
GB    1509948    *   5/1978
(Continued)

OTHER PUBLICATIONS

Machine translation of JP 8-258518, 1986.*
(Continued)

*Primary Examiner* — Justin R Fischer
(74) *Attorney, Agent, or Firm* — Thorpe North & Western

(57) ABSTRACT

A pneumatic tire comprises a plurality of protrusion portions extending along a tire side surface of a tire side portion in a direction that intersects a tire circumferential direction and a tire radial direction; the plurality of protrusion portions each including an intermediate portion in an extension direction that includes a highest position of projection height from the tire side surface, and tip portions on either side of the intermediate portion in the extension direction that include a lowest position of projection height from the tire side surface; and the plurality of protrusion portions including a radially outer protrusion portion with at least the intermediate portion disposed outward of a tire maximum width position in the tire radial direction, and a radially inner protrusion portion with at least the intermediate portion disposed inward of the tire maximum width position in the tire radial direction.

33 Claims, 20 Drawing Sheets

(56) References Cited

U.S. PATENT DOCUMENTS

| | | | |
|---|---|---|---|
| 2010/0193102 A1* | 8/2010 | Tsuruta | B60C 17/0009 152/523 |
| 2010/0294412 A1 | 11/2010 | Inoue et al. | |
| 2011/0094646 A1* | 4/2011 | Watanabe | B60C 17/0009 152/523 |
| 2013/0014877 A1 | 1/2013 | Ahn et al. | |
| 2013/0075006 A1* | 3/2013 | Kojima | B60C 13/02 152/523 |
| 2015/0165831 A1 | 6/2015 | Kodama et al. | |
| 2015/0266347 A1 | 9/2015 | Kodama et al. | |
| 2016/0207361 A1 | 7/2016 | Ferigo et al. | |

FOREIGN PATENT DOCUMENTS

| | | | |
|---|---|---|---|
| JP | 8-258518 | * | 10/1996 |
| JP | 2001-39129 | * | 2/2001 |
| JP | 2006-256433 | | 9/2006 |
| JP | 2009-029380 | | 2/2009 |
| JP | 2009-029383 | | 2/2009 |
| JP | 2013-018474 | | 1/2013 |
| JP | 2013-071634 | | 4/2013 |
| JP | 2013-071669 | | 4/2013 |
| JP | 2014-37211 | * | 2/2014 |
| JP | 2014-080099 | | 5/2014 |
| JP | 2015-212117 | | 11/2015 |
| KR | 910046 | * | 7/2009 |
| WO | WO 2007/032405 | | 3/2007 |
| WO | WO 2009/084634 | | 7/2009 |
| WO | WO 2014/024587 | | 2/2014 |
| WO | WO 2014/061311 | | 4/2014 |
| WO | WO 2014/207094 | | 12/2014 |

OTHER PUBLICATIONS

Machine translation of JP 2001-39129, 2001.*
International Search Report for International Application No. PCT/JP2016/061540 dated Jul. 12, 2016, 4 pages, Japan.

* cited by examiner

| | CONVENTIONAL EXAMPLE | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|---|
| PROTRUSION PORTION ARRANGEMENT | FIG. 32 | FIG. 2 | FIG. 2 | FIG. 2 | FIG. 2 | FIG. 2 | FIG. 2 | FIG. 2 |
| ALL RADIALLY OUTER PROTRUSION PORTIONS DISPOSED OUTWARD OF THE TIRE MAXIMUM WIDTH POSITION IN THE TIRE RADIAL DIRECTION? | - | YES | YES | YES | YES | YES | YES | YES |
| ALL RADIALLY INNER PROTRUSION PORTIONS DISPOSED INWARD OF THE TIRE MAXIMUM WIDTH POSITION IN THE TIRE RADIAL DIRECTION? | - | YES | YES | YES | YES | YES | YES | YES |
| CHANGE IN MASS OF THE PROTRUSION PORTION PER 1 DEGREE IN THE TIRE CIRCUMFERENTIAL DIRECTION (g) | - | 0.4 | 0.2 | 0.2 | 0.2 | 0.2 | 0.2 | 0.2 |
| INTERMEDIATE PORTION PROJECTION HEIGHT (mm) | 12 | 12 | 12 | 10 | 1 | 5 | 5 | 5 |
| PROJECTION HEIGHT FROM THE TIRE CROSS-SECTIONAL WIDTH AT THE TIRE MAXIMUM WIDTH POSITION (mm) | 12 | 6 | 6 | 5 | 0 | 0 | 0 | 0 |
| GROOVE IN SURFACE OF PROTRUSION PORTION? | - | - | - | - | - | - | - | - |
| RECESSED PORTION IN SURFACE OF PROTRUSION PORTION? | - | - | - | - | - | - | YES | YES |
| INTERVAL OF RADIALLY OUTER PROTRUSION PORTIONS | UNIFORM | UNIFORM | UNIFORM | UNIFORM | UNIFORM | UNIFORM | UNIFORM | UNIFORM |
| INTERVAL OF RADIALLY INNER PROTRUSION PORTIONS | UNIFORM | UNIFORM | UNIFORM | UNIFORM | UNIFORM | UNIFORM | UNIFORM | UNIFORM |
| POSITION WHEN TIRE IS MOUNTED ON A VEHICLE | VEHICLE OUTER SIDE | VEHICLE OUTER SIDE | VEHICLE OUTER SIDE | VEHICLE OUTER SIDE | VEHICLE OUTER SIDE | VEHICLE OUTER SIDE | VEHICLE OUTER SIDE | VEHICLE OUTER SIDE |
| LIFT REDUCING PERFORMANCE | 100 | 102 | 102 | 102 | 102 | 102 | 102 | 102 |
| AIR RESISTANCE REDUCING PERFORMANCE | 100 | 101 | 101 | 102 | 102 | 103 | 103 | 103 |
| UNIFORMITY | 100 | 101 | 101.5 | 101.5 | 101.5 | 101.5 | 102 | 102 |
| PROTRUSION PORTION DURABILITY PERFORMANCE | FAIL | PASS | PASS | PASS | PASS | PASS | PASS | PASS |
| RIDE COMFORT PERFORMANCE | 100 | 100 | 100 | 100 | 100 | 100 | 101 | 101 |
| SOUND PRESSURE LEVEL REDUCING PERFORMANCE | 100 | 100 | 100 | 100 | 100 | 100 | 100 | 100 |

FIG. 31A

| | EXAMPLE 8 | EXAMPLE 9 | EXAMPLE 10 | EXAMPLE 11 | EXAMPLE 12 | EXAMPLE 13 | EXAMPLE 14 | EXAMPLE 15 |
|---|---|---|---|---|---|---|---|---|
| PROTRUSION PORTION ARRANGEMENT | FIG. 2 | FIG. 2 | FIG. 2 | FIG. 2 | FIG. 2 | FIG. 2 | FIG. 5 | FIG. 6 |
| ALL RADIALLY OUTER PROTRUSION PORTIONS DISPOSED OUTWARD OF THE TIRE MAXIMUM WIDTH POSITION IN THE TIRE RADIAL DIRECTION? | YES | YES | YES | YES | YES | YES | - | YES |
| ALL RADIALLY INNER PROTRUSION PORTIONS DISPOSED INWARD OF THE TIRE MAXIMUM WIDTH POSITION IN THE TIRE RADIAL DIRECTION? | YES | YES | YES | YES | YES | YES | YES | - |
| CHANGE IN MASS OF THE PROTRUSION PORTION PER 1 DEGREE IN THE TIRE CIRCUMFERENTIAL DIRECTION (g) | 0.2 | 0.2 | 0.2 | 0.2 | 0.2 | 0.2 | 0.2 | 0.2 |
| INTERMEDIATE PORTION PROJECTION HEIGHT (mm) | 5 | 5 | 5 | 5 | 5 | 5 | 5 | 5 |
| PROJECTION HEIGHT FROM THE TIRE CROSS-SECTIONAL WIDTH AT THE TIRE MAXIMUM WIDTH POSITION (mm) | 0 | 0 | 0 | 0 | 0 | 0 | 0.5 | 0.5 |
| GROOVE IN SURFACE OF PROTRUSION PORTION? | YES | YES | YES | YES | YES | YES | YES | YES |
| RECESSED PORTION IN SURFACE OF PROTRUSION PORTION? | YES | YES | YES | YES | YES | YES | YES | YES |
| INTERVAL OF RADIALLY OUTER PROTRUSION PORTIONS | UNIFORM | NON-UNIFORM | UNIFORM | NON-UNIFORM | NON-UNIFORM | NON-UNIFORM | NON-UNIFORM | NON-UNIFORM |
| INTERVAL OF RADIALLY INNER PROTRUSION PORTIONS | UNIFORM | UNIFORM | NON-UNIFORM | NON-UNIFORM | NON-UNIFORM | NON-UNIFORM | NON-UNIFORM | NON-UNIFORM |
| POSITION WHEN TIRE IS MOUNTED ON A VEHICLE | VEHICLE OUTER SIDE | VEHICLE OUTER SIDE | VEHICLE OUTER SIDE | VEHICLE OUTER SIDE | VEHICLE INNER SIDE | VEHICLE OUTER SIDE VEHICLE INNER SIDE | VEHICLE OUTER SIDE | VEHICLE OUTER SIDE |
| LIFT REDUCING PERFORMANCE | 102 | 102 | 102 | 102 | 102 | 101.5 | 102 | 102 |
| AIR RESISTANCE REDUCING PERFORMANCE | 103 | 103 | 103 | 103 | 103 | 101 | 102 | 102 |
| UNIFORMITY | 102.5 | 102.5 | 102.5 | 102.5 | 102.5 | 102.5 | 102.5 | 102.5 |
| PROTRUSION PORTION DURABILITY PERFORMANCE | PASS | PASS | PASS | PASS | PASS | PASS | PASS | PASS |
| RIDE COMFORT PERFORMANCE | 102 | 102 | 102 | 102 | 102 | 102 | 102 | 102 |
| SOUND PRESSURE LEVEL REDUCING PERFORMANCE | 100 | 100.5 | 100.5 | 101 | 101 | 101 | 101 | 101 |

FIG. 31B

PNEUMATIC TIRE

TECHNICAL FIELD

The present technology relates to a pneumatic tire.

BACKGROUND ART

Japanese Unexamined Patent Application Publication No. 2013-18474 describes a vehicle tire that includes a sidewall on which curved projection portions are formed. Japanese Unexamined Patent Application Publication No. 2013-18474 describes how the air flow against the sidewall does not naturally pass along the sidewall. Instead, it is moved inside a wheel housing, thereby generating a downforce that presses down the top of a tread portion. Note that by the downforce being generated, lift, a force that lifts the vehicle upwards, is reduced.

Japanese Unexamined Patent Application Publication No. 2009-29380 describes a pneumatic tire that includes a plurality of inner ridges disposed in a region inward of a tire maximum width position in the tire radial direction, the extension direction of the inner ridges aligning with the tire radial direction; and a plurality of outer ridges disposed in a region outward of the tire maximum width position in the tire radial direction, the extension direction of the outer ridges being inclined with respect to the tire radial direction; wherein adjacent outer ridges are inclined in the opposite direction with respect to the tire radial direction. Japanese Unexamined Patent Application Publication No. 2009-29380 describes how by disposing ridges for generating turbulent flow in an optimized pattern in an inner and outer region in the tire radial direction on either side of the tire maximum width position, the effect of reducing the temperature of a tire side portion can be further increased, and thus durability can be increased.

Additionally, International Patent Application Publication No. WO 2014/024587 describes a circumferential protrusion portion that extends lengthwise along mainly a tire circumferential direction, the protrusion portion being disposed outward of a tire maximum width position in a tire radial direction on at least one tire side portion. International Patent Application Publication No. WO 2014/024587 describes how, by the air passing through the tire side portion being made turbulent by the circumferential protrusion portion, a turbulent flow boundary layer is generated around the pneumatic tire. This suppresses the expansion of the air passing out behind the vehicle on the vehicle outer side. As a result, the spread of passing air can be suppressed, air resistance of the pneumatic tire can be reduced, and fuel economy can be improved.

However, the pneumatic tires described in Japanese Unexamined Patent Application Publication Nos. 2013-18474 and 2009-29380 and in International Patent Application Publication No. WO 2014/024587 may experience a decrease in uniformity in the tire circumferential direction due to the projection portions, ridges, or circumferential protrusion portions, resulting in a loss of good uniformity.

SUMMARY

The present technology provides a pneumatic tire that can provide reduced lift and air resistance while maintaining good uniformity.

A pneumatic tire according to an embodiment of the present technology comprises a plurality of protrusion portions extending along a tire side surface of a tire side portion in a direction that intersects a tire circumferential direction and a tire radial direction; the plurality of protrusion portions each including an intermediate portion in an extension direction that includes a highest position of projection height from the tire side surface, and tip portions on either side of the intermediate portion in the extension direction that include a lowest position of projection height from the tire side surface; and the plurality of protrusion portions including a radially outer protrusion portion with at least the intermediate portion disposed outward of a tire maximum width position in the tire radial direction, and a radially inner protrusion portion with at least the intermediate portion disposed inward of the tire maximum width position in the tire radial direction.

According to the pneumatic tire, the protrusion portions that rotate when the vehicle travels make the air turbulent and minimize the slow air flow around the pneumatic tire. Specifically, at the lower portion of the pneumatic tire when the pneumatic tire is rotating, the speed of the air flowing past the bottom portion of the vehicle is increased. This reduces the air flow from down to up, thus suppressing the air pressure upward. As a result, lift can be suppressed, the contact of the pneumatic tire with the ground can be improved, and the steering stability performance, which is a measure of driving performance of the vehicle, can be improved. Additionally, at the upper portion of the pneumatic tire when the pneumatic tire is rotating, a turbulent flow boundary layer is generated. This promotes the air flow around the pneumatic tire. As a result, the spread of the passing air is suppressed, so the air resistance of the pneumatic tire can be reduced. Reducing the air resistance leads to an improvement in the fuel economy of the vehicle.

Additionally, according to the pneumatic tire, in the protrusion portion, the intermediate portion in the extension direction that intersects the tire circumferential direction and the tire radial direction includes the highest position of projection height from the tire side surface, and the tip portions provided on either side of the intermediate portion in the extension direction each include the lowest position of projection height from the tire side surface. Accordingly, the mass of the protrusion portion is lower at the tip portions. As a result, a sudden change in mass from the tire side surface at the area near the tip portions of the protrusion portion is prevented, improving uniformity in the tire circumferential direction, and in turn improving uniformity.

Additionally, according to the pneumatic tire, the protrusion portion includes the radially outer protrusion portion with the intermediate portion that includes the highest position of projection height disposed outward of the tire maximum width position in the tire radial direction and the radially inner protrusion portion with the intermediate portion that includes the highest position of projection height disposed inward of the tire maximum width position in the tire radial direction. Thus, the air resistance at the tire maximum width position where the pneumatic tire is widest in the tire lateral direction making the air resistance here also great is reduced. As a result, air resistance is further reduced.

Accordingly, the pneumatic tire can provide reduced lift and air resistance while maintaining good uniformity.

In the pneumatic tire according another embodiment of the present technology, the intermediate portion and the tip portions of the radially outer protrusion portion are disposed outward of the tire maximum width position in the tire radial direction.

According to the pneumatic tire, by the tip portions being not disposed beyond the tire maximum width position, the air resistance at the tire maximum width position where the pneumatic tire is the widest in the tire lateral direction, making the air resistance here also great, is reduced. As a result, the effect of significantly reducing air resistance can be obtained.

In the pneumatic tire according another embodiment of the present technology, the intermediate portion and the tip portions of the radially inner protrusion portion are disposed inward of the tire maximum width position in the tire radial direction.

According to the pneumatic tire, by the tip portions being not disposed beyond the tire maximum width position, the mass at the tire maximum width position where the pneumatic tire is the widest in the tire lateral direction, making the air resistance here also great, is reduced. As a result, the effect of significantly reducing air resistance can be obtained.

In the pneumatic tire according another embodiment of the present technology, a change in mass of the protrusion portion in the tire circumferential direction per 1 degree in the tire circumferential direction is 0.2 g/degree or less.

According to the pneumatic tire, by the change in mass of the protrusion portion in the tire circumferential direction being specified as such, uniformity in the tire circumferential direction is improved. As a result, the effect of significantly improving uniformity can be obtained.

In the pneumatic tire according another embodiment of the present technology, the intermediate portion of the protrusion portion has a projection height ranging from 1 mm to 10 mm.

When the projection height of the intermediate portion is less than 1 mm, the effect of increasing the speed of the air flow past the bottom portion of the vehicle and generating a turbulent flow boundary layer is difficult to obtain. When the projection height of the intermediate portion is greater than 10 mm, the amount of air flow colliding with the protrusion portion is increased. As a result, air resistance is likely to increase. Thus, to obtain the effect of significantly reducing lift and air resistance, the projection height of the intermediate portion preferably ranges from 1 mm to 10 mm.

In the pneumatic tire according another embodiment of the present technology, when the pneumatic tire is mounted on a regular rim, inflated to a regular internal pressure, in an unloaded state, and viewed in a meridian cross-section, the protrusion portion projects outward 5 mm or less in a tire lateral direction from a tire cross-sectional width at the tire maximum width position.

When the protrusion portion projects outward in the tire lateral direction from the tire cross-sectional width at the tire maximum width position greater than 5 mm, the amount of air flow colliding with the protrusion portion is increased. As a result, the air resistance of the protrusion portion is likely to increase. Thus, by specifying the range in which the protrusion portion projects outward in the tire lateral direction from the tire cross-sectional width at the tire maximum width position, an increase in the air resistance caused by the protrusion portion can be suppressed, and the effect of the protrusion portion significantly improving the slow air flow can be obtained.

In the pneumatic tire according another embodiment of the present technology, a groove is formed on a surface of the protrusion portion.

According to the pneumatic tire, by the groove being formed, the rigidity of the protrusion portion is decreased. As a result, a decrease in ride comfort due to the tire side portion being made a rigid structure by the protrusion portions can be suppressed. Additionally, by the groove being formed, the mass of the protrusion portion is decreased. As a result, a decrease in uniformity due to the protrusion portions increasing the mass of the tire side portion can be suppressed.

In the pneumatic tire according another embodiment of the present technology, a recessed portion is formed on a surface of the protrusion portion.

According to the pneumatic tire, by the recessed portion being formed, the rigidity of the protrusion portion is decreased. As a result, a decrease in ride comfort due to the tire side portion being made a rigid structure by the protrusion portions can be suppressed. Additionally, by the recessed portion being formed, the mass of the protrusion portion is decreased. As a result, a decrease in uniformity due to the protrusion portions increasing the mass of the tire side portion can be suppressed. Additionally, by the recessed portion and the groove being formed, the effects described above can be further improved.

In the pneumatic tire according another embodiment of the present technology, the plurality of protrusion portions are disposed in the tire circumferential direction at non-uniform intervals.

According to the pneumatic tire, by counteracting the periodicity of the protrusion portions in the tire circumferential direction related to the air flow along the tire side surface of the tire side portion, the difference in frequency causes the sound pressure generated by the protrusion portions to be dispersed and offset. As a result, noise can be reduced.

In the pneumatic tire according another embodiment of the present technology, a vehicle inner/outer orientation when the pneumatic tire is mounted on a vehicle is designated, and the plurality of protrusion portions are at least formed on a tire side portion that corresponds to a vehicle outer side.

According to the pneumatic tire, the tire side portion on the vehicle outer side is exposed outward from the tire housing when the pneumatic tire is mounted on the vehicle. Thus, by the protrusion portions being provided on the tire side portion on the vehicle outer side, the air flow can be pushed in the vehicle outer side direction. This allows the effect of significantly reducing lift and air resistance to be obtained.

The pneumatic tire according to an embodiment of the present technology can provide reduced lift and air resistance while maintaining good uniformity.

BRIEF DESCRIPTION OF DRAWINGS

FIGS. 31A-31B include a table showing results of performance tests on pneumatic tires according to examples of the present technology.

DETAILED DESCRIPTION

Embodiments of the present technology are described in detail below with reference to the drawings. However, the present technology is not limited by the embodiments. Constituents of the embodiments include elements that can be easily replaced by those skilled in the art and elements substantially the same as the constituents of the embodiments. Furthermore, the modified examples described in the embodiments can be combined as desired within the scope apparent to those skilled in the art.

Figure 1:
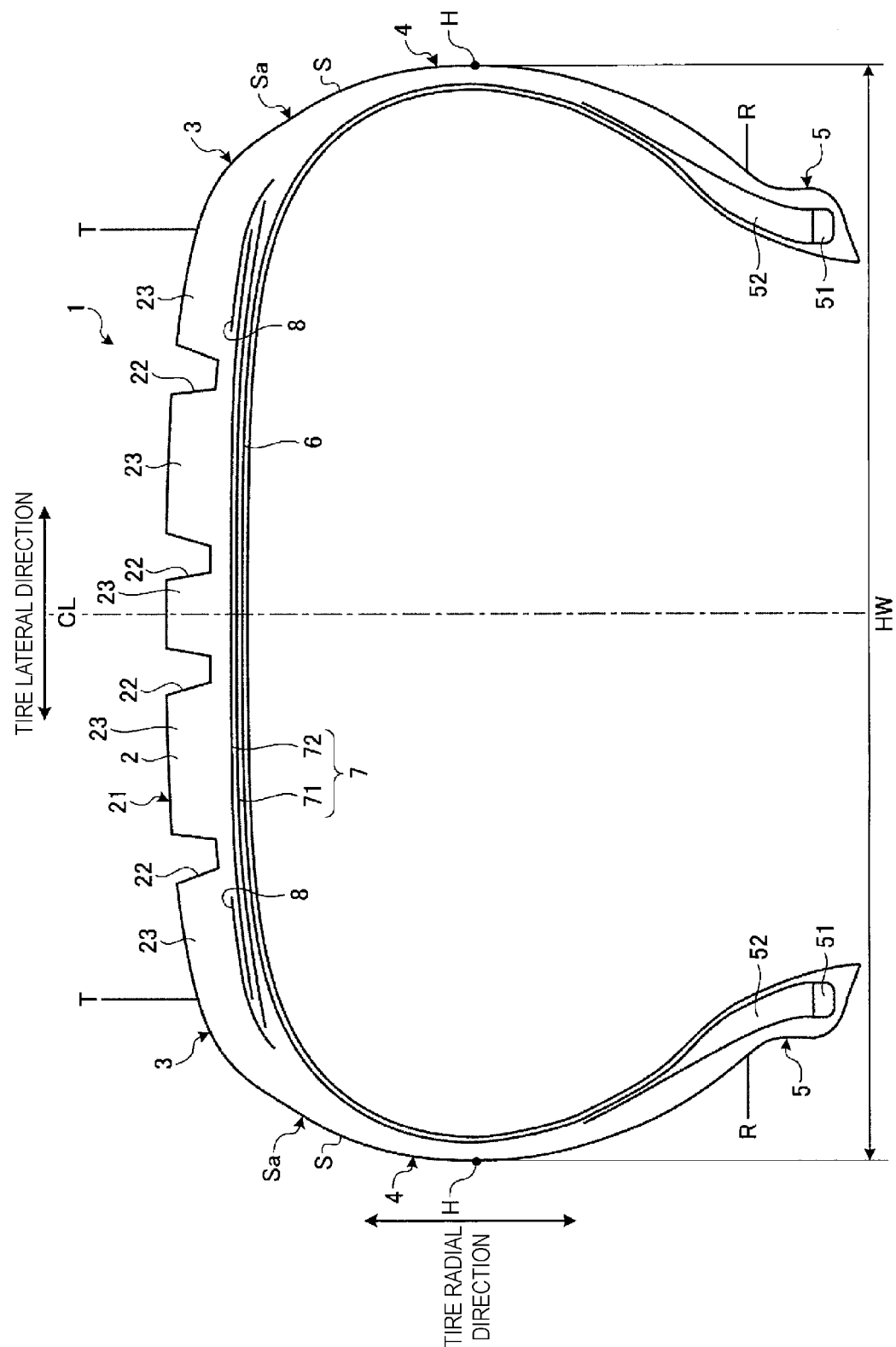
FIG. 1 is a meridian cross-sectional view of a pneumatic tire according to an embodiment of the present technology.

FIG. 1 is a meridian cross-sectional view of a pneumatic tire according to the present embodiment.

In the following description, "tire radial direction" refers to the direction orthogonal to the rotation axis P (see FIG. 2) of a pneumatic tire 1. "Inward in the tire radial direction" refers to the direction toward the rotation axis P in the tire radial direction. "Outward in the tire radial direction" refers to the direction away from the rotation axis P in the tire radial direction. "Tire circumferential direction" refers to the circumferential direction with the rotation axis P as the center axis. Additionally, "tire lateral direction" refers to the direction parallel with the rotation axis P. "Inward in the tire lateral direction" refers to the direction toward a tire equatorial plane CL (tire equator line) in the tire lateral direction. "Outward in the tire lateral direction" refers to the direction away from the tire equatorial plane CL in the tire lateral direction. "Tire equatorial plane CL" refers to a plane that is orthogonal to the rotation axis P of the pneumatic tire 1 and that passes through a center in the tire lateral direction of the pneumatic tire 1. "Tire width" is a width in the tire lateral direction between components located outward in the tire lateral direction, or in other words, the distance between the components that are most distant from the tire equatorial plane CL in the tire lateral direction. "Tire equator line" refers to the line along the tire circumferential direction of the pneumatic tire 1 that lies on the tire equatorial plane CL. In the present embodiment, the tire equator line and the tire equatorial plane are both denoted by reference sign CL.

As illustrated in FIG. 1, the pneumatic tire 1 includes a tread portion 2, shoulder portions 3 on opposite sides of the tread portion 2, and sidewall portions 4 and bead portions 5 continuing in that order from the shoulder portions 3. Additionally, the pneumatic tire 1 includes a carcass layer 6, a belt layer 7, and a belt reinforcing layer 8.

The tread portion 2 is formed from a rubber material (tread rubber) and is exposed on the outermost side of the pneumatic tire 1 in the tire radial direction, with the surface thereof constituting the profile of the pneumatic tire 1. A tread surface 21 is formed on an outer peripheral surface of the tread portion 2, in other words, on a road contact surface that comes in contact with a road surface when traveling. The tread surface 21 is provided with a plurality (four in the present embodiment) of main grooves 22 that extend in the tire circumferential direction. The main grooves 22 are straight main grooves parallel with the tire equator line CL. Moreover, a plurality of rib-like land portions 23 extending in the tire circumferential direction and parallel with the tire equator line CL are formed in the tread surface 21 by the plurality of main grooves 22. Additionally, while not illustrated in the drawings, lug grooves that meet with the main grooves 22 in each of the land portions 23 are provided in the tread surface 21. The land portions 23 are divided into a plurality of segments in the tire circumferential direction by the lug grooves. Additionally, lug grooves are formed in the outermost side of the tread portion 2 in the tire lateral direction so as to open outward in the tire lateral direction of the tread portion 2. Note that the lug grooves may have a form that communicates with the main grooves 22 or may have a form that does not communicate with the main grooves 22.

The shoulder portions 3 are portions of the tread portion 2 located outward in the tire lateral direction on both sides. Additionally, the sidewall portions 4 are exposed on the outermost sides of the pneumatic tire 1 in the tire lateral direction. The bead portions 5 each include a bead core 51 and a bead filler 52. The bead core 51 is formed by a bead wire, which is a steel wire, wound into an annular shape. The bead filler 52 is a rubber material that is disposed in space formed by an end of the carcass layer 6 in the tire lateral direction folded back at the position of the bead core 51.

The end portions of the carcass layer 6 in the tire lateral direction are folded back around the pair of bead cores 51 from inward to outward in the tire lateral direction, and the carcass layer 6 is stretched in a toroidal shape in the tire circumferential direction to form the framework of the tire. The carcass layer 6 is constituted by a plurality of coating-rubber-covered carcass cords (not illustrated) disposed in alignment at an angle with respect to the tire circumferential direction that conforms with the tire meridian direction. The carcass cords are made of organic fibers (e.g., polyester, rayon, nylon, or the like). At least one carcass layer 6 is provided.

The belt layer 7 has a multi-layer structure in which at least two belts 71, 72 are layered. In the tread portion 2, the belt layer 7 is disposed outward of the carcass layer 6 in the tire radial direction, i.e. on the outer circumference thereof, and covers the carcass layer 6 in the tire circumferential direction. The belts 71 and 72 include a plurality of cords (not illustrated) disposed in alignment at a predetermined angle with respect to the tire circumferential direction (for example, from 20° to 30°), and covered by a coating rubber. The cords are made of steel or organic fibers (polyester, rayon, nylon, or the like). Moreover, the belts 71 and 72 overlap each other and are disposed so that the directions of the cords of the respective belts intersect each other.

The belt reinforcing layer 8 is disposed outward of the belt layer 7 in the tire radial direction, i.e. on the outer circumference thereof, and covers the belt layer 7 in the tire circumferential direction. The belt reinforcing layer 8 includes a plurality of cords (not illustrated) disposed in alignment in the tire lateral direction substantially parallel (±5°) to the tire circumferential direction, which are covered by a coating rubber. The cords are made of steel or organic fibers (polyester, rayon, nylon, or the like). The belt reinforcing layer 8 illustrated in FIG. 1 is disposed so as to cover end portions of the belt layer 7 in the tire lateral direction. The configuration of the belt reinforcing layer 8 is not limited to that described above. Although not illustrated in the drawings, a configuration may be used in which the belt reinforcing layer 8 is disposed so as to cover the entire belt layer 7. Alternatively, for example, a configuration with two reinforcing layers may be used, in which the inner reinforcing layer in the tire radial direction is formed larger than the belt layer 7 in the tire lateral direction so as to cover the entire the belt layer 7, and the outer reinforcing layer in the tire radial direction is disposed so as to only cover the end portions of the belt layer 7 in the tire lateral direction. In another example, a configuration with two reinforcing layers may be used, in which both of the reinforcing layers are disposed so as to only cover the end portions of the belt layer 7 in the tire lateral direction. In other words, the belt reinforcing layer 8 overlaps with at least the end portions of the belt layer 7 in the tire lateral direction. Additionally, the belt reinforcing layer 8 is constituted of a band-like strip material (having, for example, a width of 10 mm) wound in the tire circumferential direction.

Figure 2:
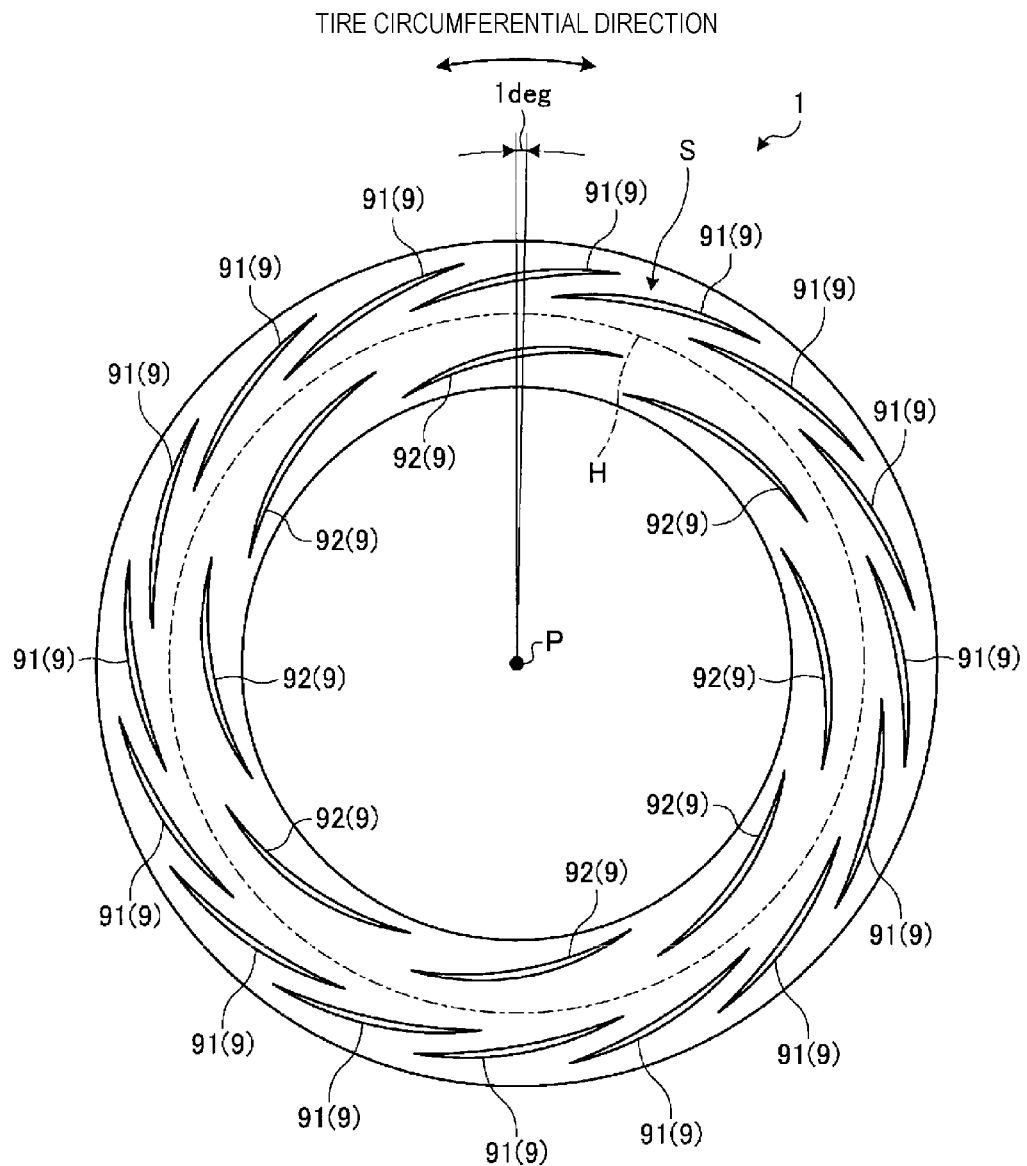
FIG. 2 is a side view of a pneumatic tire according to an embodiment of the present technology.
Figure 3:
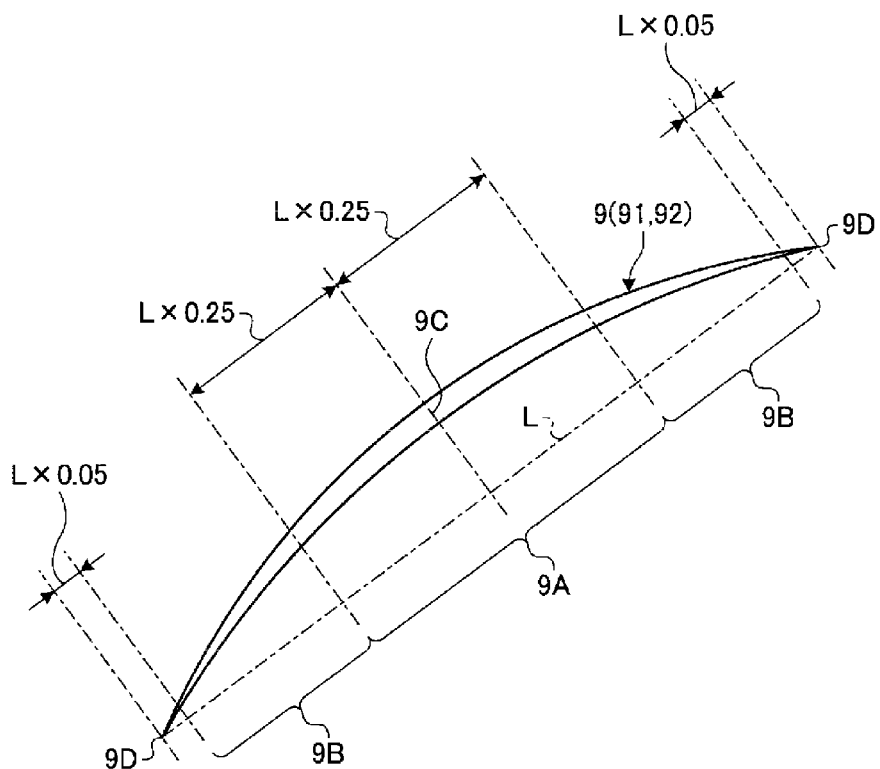
FIG. 3 is an enlarged view of a protrusion portion as viewed from the side of a pneumatic tire.
Figure 4:
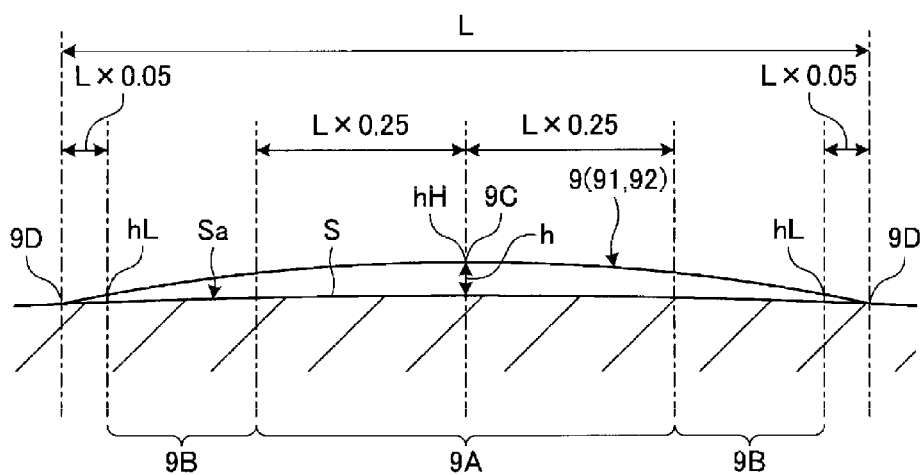
FIG. 4 is a side view of a protrusion portion.
Figure 22:
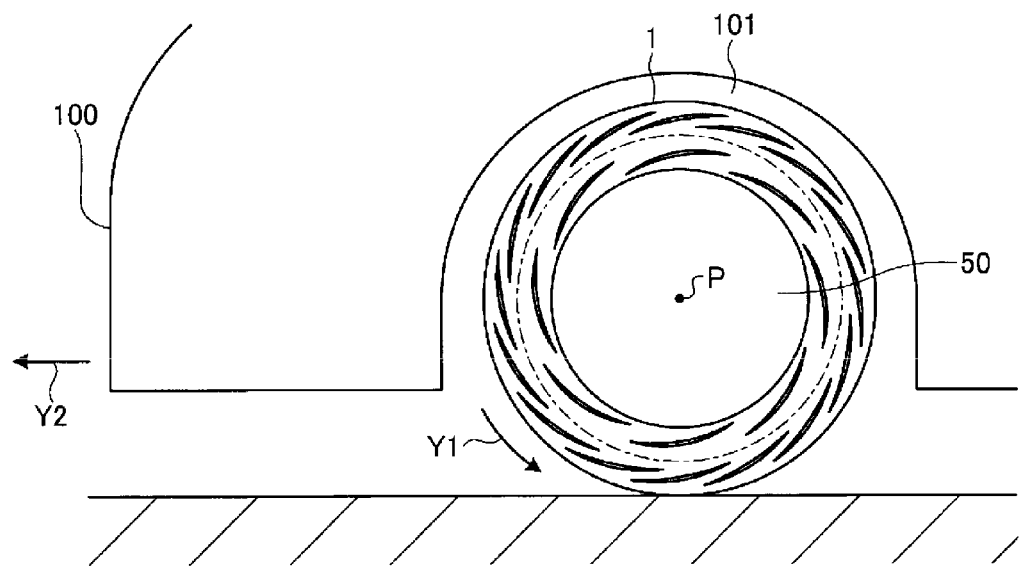
FIG. 22 is an explanatory diagram of the function of a pneumatic tire according to an embodiment of the present technology.
Figure 23:
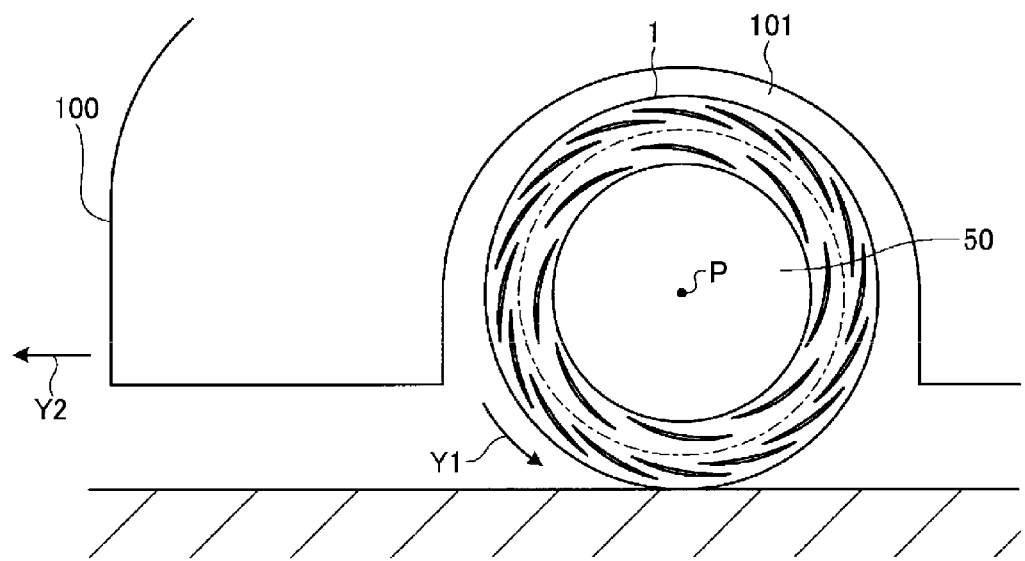
FIG. 23 is an explanatory diagram of the function of a pneumatic tire according to an embodiment of the present technology.
Figure 24:
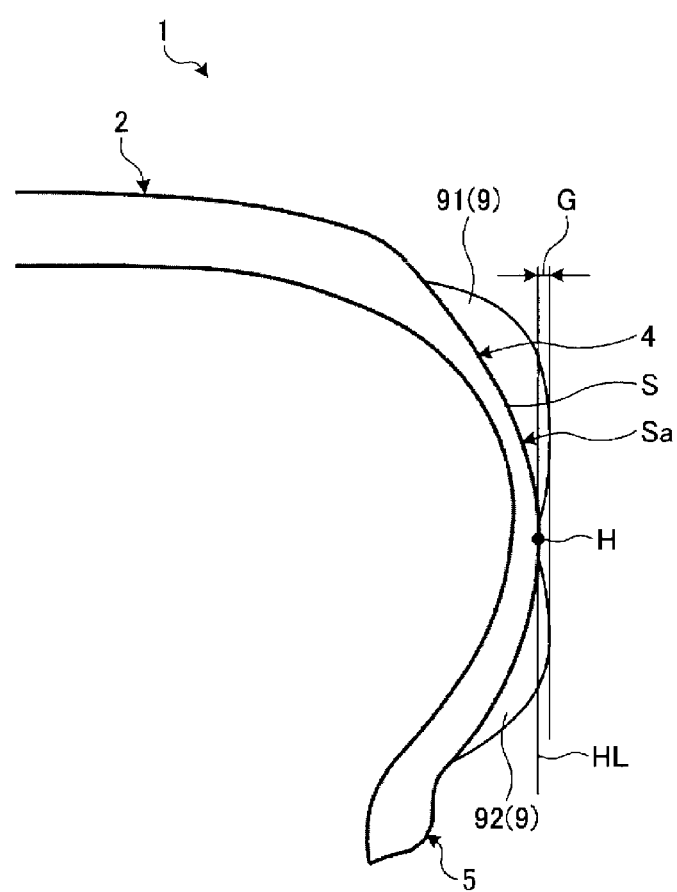
FIG. 24 is a meridian cross-sectional view of a portion of a pneumatic tire according to an embodiment of the present technology.
Figure 25:
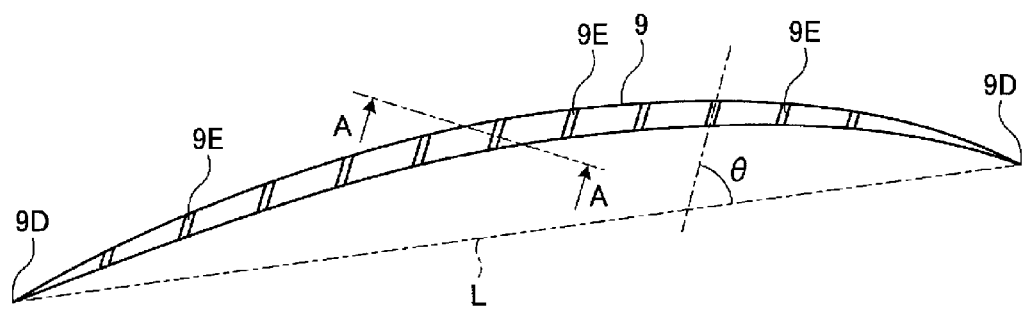
FIG. 25 is an enlarged view of a protrusion portion in which grooves are formed as viewed from the side of a pneumatic tire.
Figure 26:
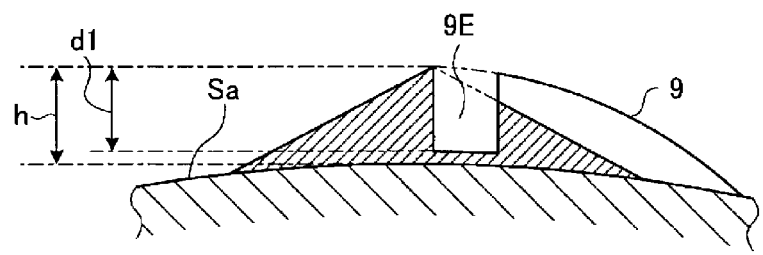
FIG. 26 is a cross-sectional view taken along line A-A of FIG. 25.
Figure 27:
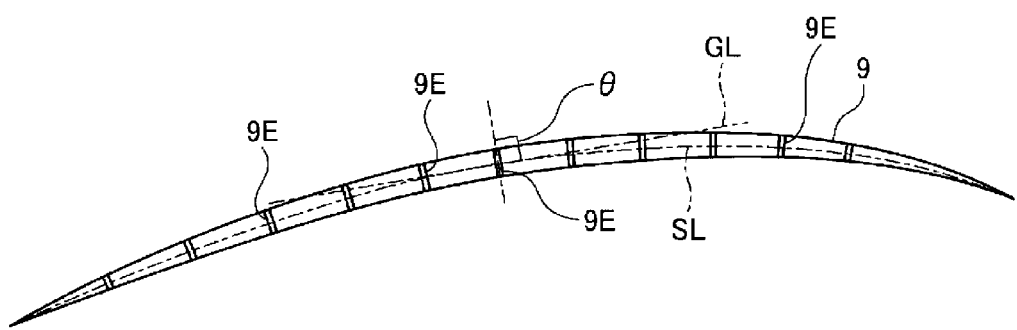
FIG. 27 is an enlarged view of another example of a protrusion portion in which grooves are formed as viewed from the side of a pneumatic tire.
Figure 28:
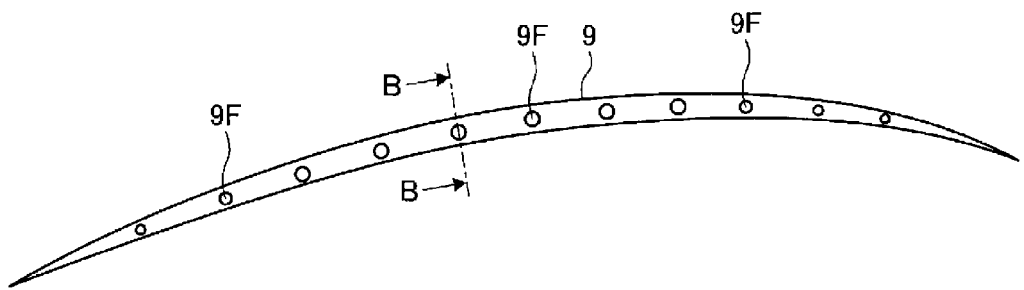
FIG. 28 is an enlarged view of a protrusion portion in which recessed portions are formed as viewed from the side of a pneumatic tire.
Figure 29:
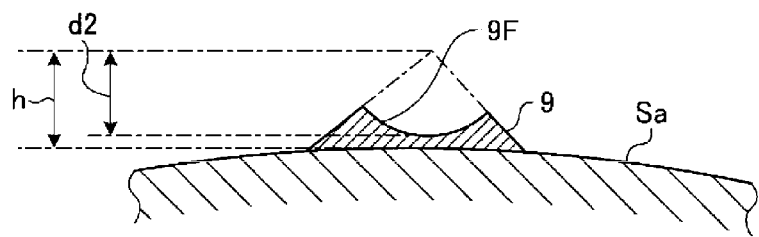
FIG. 29 is a cross-sectional view taken along line B-B of FIG. 28.
Figure 30:
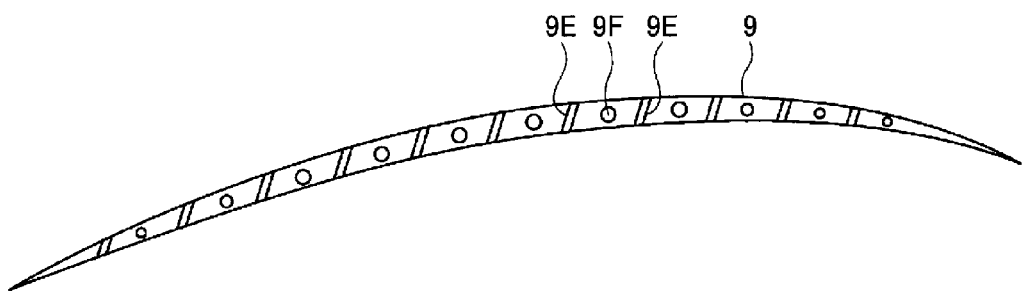
FIG. 30 is an enlarged view of a protrusion portion in which grooves and recessed portions are formed as viewed from the side of a pneumatic tire.

FIG. 2 is a side view of a pneumatic tire according to an embodiment of the present technology. FIG. 3 is an enlarged view of a protrusion portion as viewed from the side of the pneumatic tire. FIG. 4 is a side view of a protrusion portion. FIGS. 5 to 9 are side views of other examples of a pneumatic tire according to present embodiment. FIGS. 10 to 21 are cross-sectional views in the lateral direction of a protrusion portion. FIGS. 22 and 23 are explanatory diagrams of the function of a pneumatic tire according to the present embodiment. FIG. 24 is a meridian cross-sectional view of a portion of the pneumatic tire according to the present embodiment. FIG. 25 is an enlarged view of a protrusion portion in which grooves are formed as viewed from the side of a pneumatic tire. FIG. 26 is a cross-sectional view taken along line A-A of FIG. 25. FIG. 27 is an enlarged view of another example of a protrusion portion in which grooves are formed as viewed from the side of a pneumatic tire. FIG. 28 is an enlarged view of a protrusion portion in which recessed portions are formed as viewed from the side of a pneumatic tire. FIG. 29 is a cross-sectional view taken along line B-B of FIG. 28. FIG. 30 is an enlarged view of a protrusion portion in which grooves and recessed portions are formed as viewed from the side of a pneumatic tire.

Herein, as illustrated in FIG. 1, "tire side portion S" refers to the surface that uniformly continues from a ground contact edge T of the tread portion 2 outward in the tire lateral direction, or, in other words, a range from a rim check line R outward in the tire radial direction. Additionally, "ground contact edge T" refers to both outermost edges in the tire lateral direction of a region in which the tread surface 21 of the tread portion 2 of the pneumatic tire 1 contacts the road surface with the pneumatic tire 1 mounted on a regular rim, inflated to the regular internal pressure, and loaded with 70% of the regular load. The ground contact edge T is continuous in the tire circumferential direction. Moreover, "rim check line R" refers to a line used to confirm whether the tire has been mounted on the rim correctly and, typically, is an annular convex line closer to the outer side in the tire radial direction than a rim flange and continues in the tire circumferential direction along a portion approximate to the rim flange on a front side surface of the bead portions 5.

As illustrated in FIG. 1, "tire maximum width position H" refers to the ends of the tire cross-sectional width HW where the width in the tire lateral direction is the greatest. "Tire cross-sectional width HW" is the maximum total tire width in the tire lateral direction, excluding any patterns and alphanumerics, when the pneumatic tire 1 is mounted on a regular rim, inflated to the regular internal pressure, and in an unloaded state. In tires provided with a rim protection bar (provided in the tire circumferential direction and projecting outward in the tire lateral direction) that protects the rim, the rim protection bar is the outermost portion in the tire lateral direction, but the tire cross-sectional width HW as defined in the present embodiment excludes the rim protection bar.

Here, "regular rim" refers to a "standard rim" defined by the Japan Automobile Tyre Manufacturers Association Inc. (JATMA), "Design Rim" defined by the Tire and Rim Association, Inc. (TRA), or "Measuring Rim" defined by the European Tyre and Rim Technical Organisation (ETRTO). "Regular internal pressure" refers to "maximum air pressure" defined by JATMA, a maximum value given in "TIRE LOAD LIMITS AT VARIOUS COLD INFLATION PRESSURES" defined by TRA, or "INFLATION PRESSURES" defined by ETRTO. "Regular load" refers a "maximum load capacity" defined by JATMA, the maximum value given in "TIRE LOAD LIMITS AT VARIOUS COLD INFLATION PRESSURES" defined by TRA, and a "LOAD CAPACITY" defined by ETRTO.

The pneumatic tire 1 of the present embodiment, as illustrated in FIGS. 2 to 4, a protrusion portion 9 is provided on at least one side portion S projecting outward beyond a tire side surface Sa that corresponds to the profile of the surface of the tire side portion S. The protrusion portion 9 is formed from a rubber material (the same rubber material that constitutes the tire side portion S or a different rubber material) as a ridge that extends along the tire side surface Sa of the tire side portion S in a direction that intersects the tire circumferential direction and the tire radial direction. In the present embodiment, the protrusion portion 9 illustrated in the drawings curves in a C-shape when viewed from the side of the pneumatic tire 1. The protrusion portion 9 is not limited to being curved and may be linear when viewed from the side of the pneumatic tire 1, may be formed in a V-shape, may be formed in a S-shape, may have meandering configuration, or may have a zigzag shape.

As illustrated in FIGS. 3 and 4, the protrusion portion 9 includes an intermediate portion 9A in the extension direction, and tip portions 9B provided continuing from the intermediate portion 9A on either side in the extension direction. The intermediate portion 9A is the portion in the range of 25% of the length L of the protrusion portion 9 in the extension direction from a center 9C on either side in the extension direction. The tip portions 9B are portions that extend from the intermediate portion 9A on both sides in the extension direction excluding 5% of the length L of the protrusion portion 9 in the extension direction from ends 9D in the extension direction. The length L of the protrusion portion 9 in the extension direction is the shortest distance between the ends 9D of the protrusion portion 9.

The intermediate portion 9A also includes a highest position hH where the projection height h from the tire side surface Sa is the greatest. The tip portion 9B also includes a lowest position hL where the projection height h from the tire side surface Sa is the lowest. In FIG. 4, the projection height h of the protrusion portion 9 in the extension direction gradually increases from one end 9D toward the center 9C and gradually decreases from the center 9C toward the other end 9D. In such a configuration, the highest position hH of the projection height h corresponds with the center 9C, and the lowest position hL corresponds with the ends of the tip portions 9B, i.e. the positions 5% of the length L from the ends 9D. Note that in FIG. 4, the projection height h of the protrusion portion 9 in the extension direction is illustrated changing in an arcuate manner. However, not such limitation is intended and it may change in a linear manner. Additionally, the highest position hH may include the entire intermediate portion 9A, and in such a configuration, the tip portions 9B may have a projection height h that gradually decreases from the intermediate portion 9A.

As illustrated in FIG. 2, the protrusion portion 9 includes, in the region of the tire side portion S, a plurality of radially outer protrusion portions 91 disposed outward of the tire maximum width position H in the tire radial direction, and a plurality of radially inner protrusion portions 92 disposed inward of the tire maximum width position H in the tire radial direction. The radially outer protrusion portions 91 and the radially inner protrusion portions 92 are both disposed at predetermined intervals in the tire circumferential direction.

Figure 5:
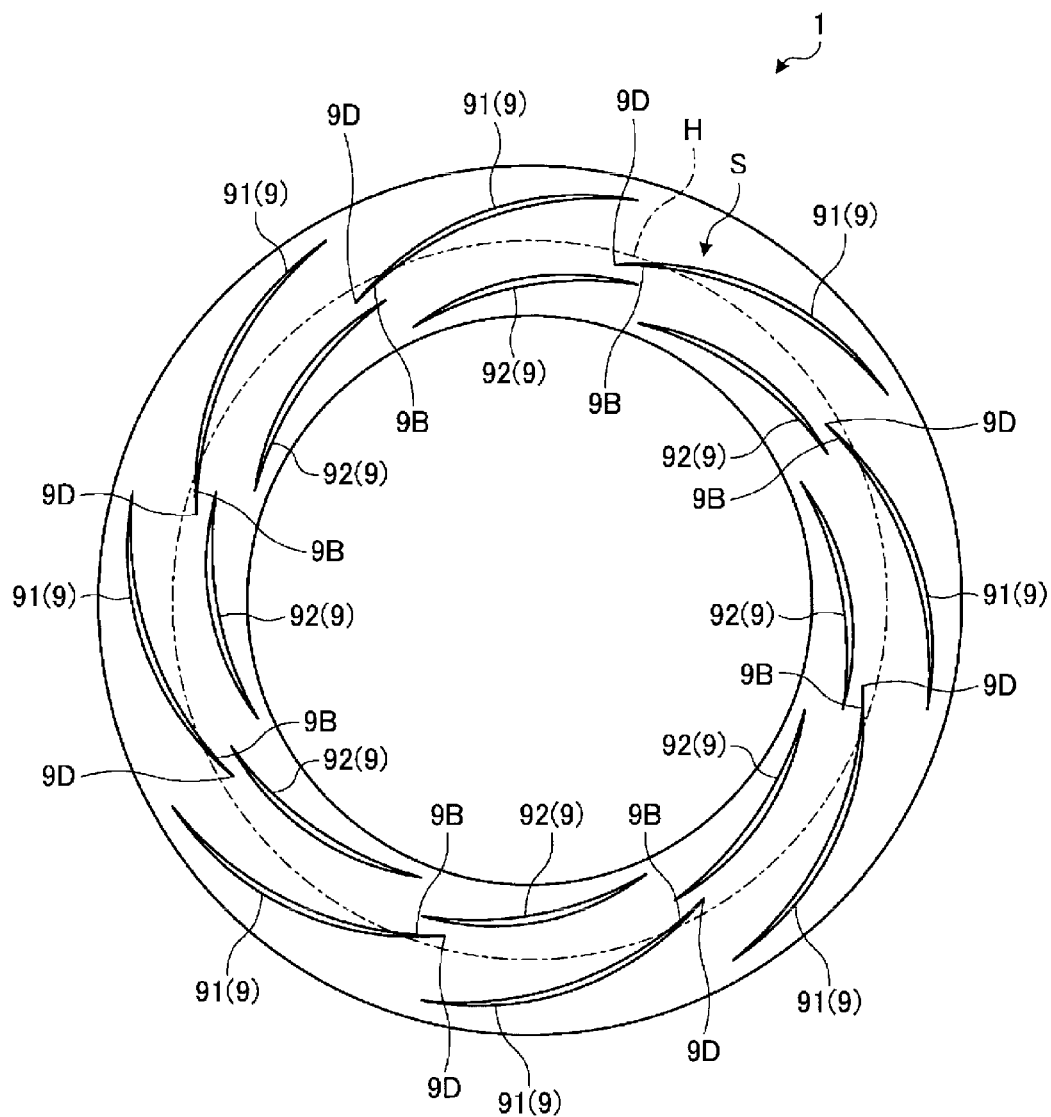
FIG. 5 is a side view of another example of a pneumatic tire according to an embodiment of the present technology.
Figure 6:
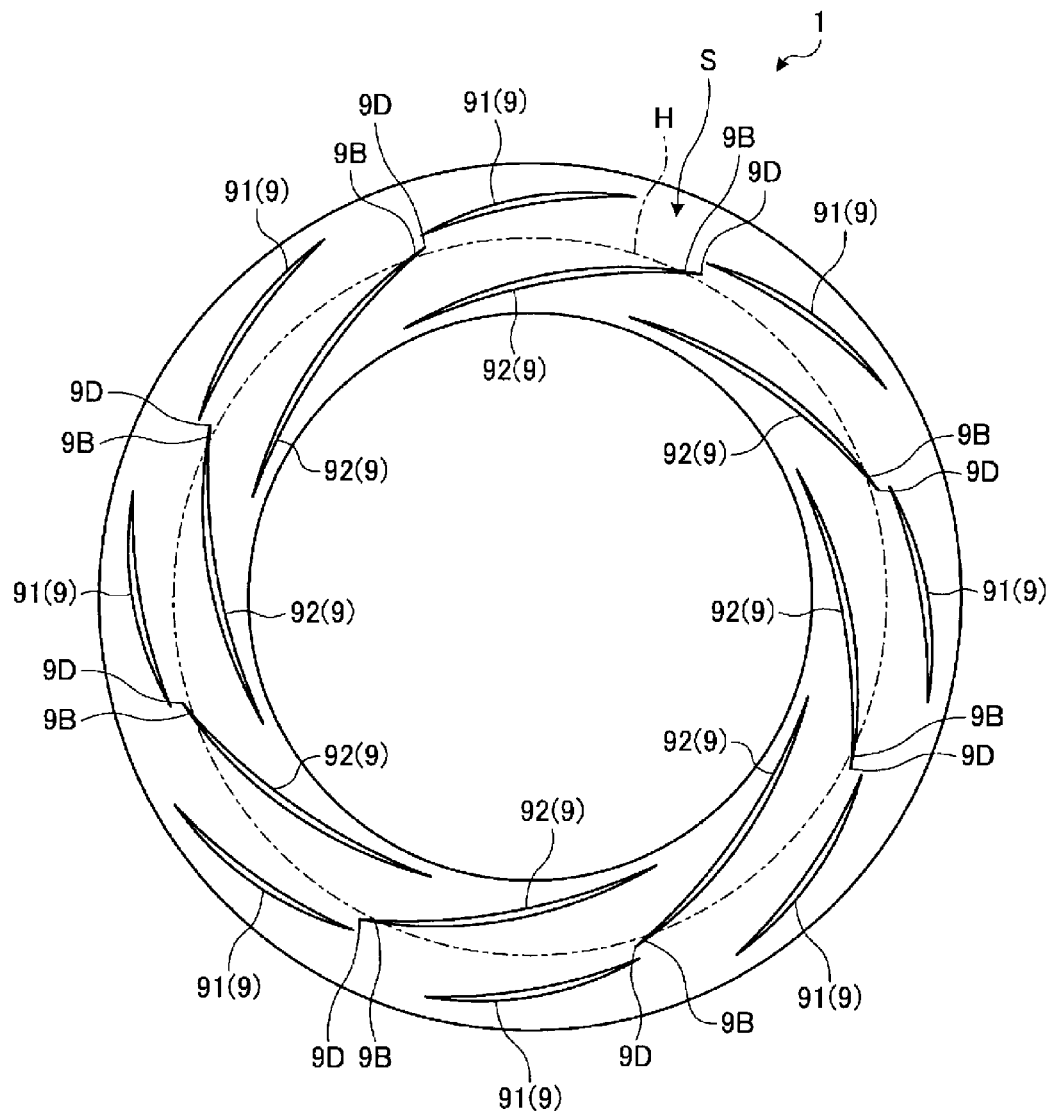
FIG. 6 is a side view of another example of a pneumatic tire according to an embodiment of the present technology.

Note that as illustrated in FIG. 5, the radially outer protrusion portions 91 may partially extend inward of the tire maximum width position H in the tire radial direction. In such a configuration, the intermediate portion 9A is disposed outward of the tire maximum width position H in the tire radial direction, and at least one of the tip portions 9B (or the area 5% of the length L from the end 9D) extends inward beyond the tire maximum width position H in the tire radial direction. Additionally, in FIG. 5, all of the radially outer protrusion portions 91 partially extend inward beyond the tire maximum width position H in the tire radial direction. However, this may hold true for only at least some of the plurality. As illustrated in FIG. 6, the radially inner protrusion portions 92 may partially extend outward of the tire maximum width position H in the tire radial direction. In such a configuration, the intermediate portion 9A is disposed inward of the tire maximum width position H in the tire radial direction, and at least one of the tip portions 9B (or the area 5% of the length L from the end 9D) extends outward beyond the tire maximum width position H in the tire radial direction. Additionally, in FIG. 6, all of the radially inner protrusion portions 92 partially extend outward beyond the tire maximum width position H in the tire radial direction. However, this may hold true for only at least some of the plurality. Note that although not illustrated in the drawings, the radially outer protrusion portions 91 and the radially inner protrusion portions 92 may both partially extend beyond the tire maximum width position H. Thus, the protrusion portion 9 includes, in the region of the tire side portion S, a plurality of radially outer protrusion portions 91 with a main portion (the intermediate portion 9A) disposed outward of the tire maximum width position H in the tire radial direction, and a plurality of radially inner protrusion portions 92 with a main portion (the intermediate portion 9A) disposed inward of the tire maximum width position H in the tire radial direction.

Note that for tires provided with a rim protection bar, the radially inner protrusion portions 92 may have a configuration in which an inner end portion in the tire radial direction does not reach the rim protection bar, a configuration in which an inner end portion in the tire radial direction reaches partway up the projection of the rim protection bar, or a configuration in which an inner end portion in the tire radial direction reaches the top of the rim protection bar.

Figure 7:
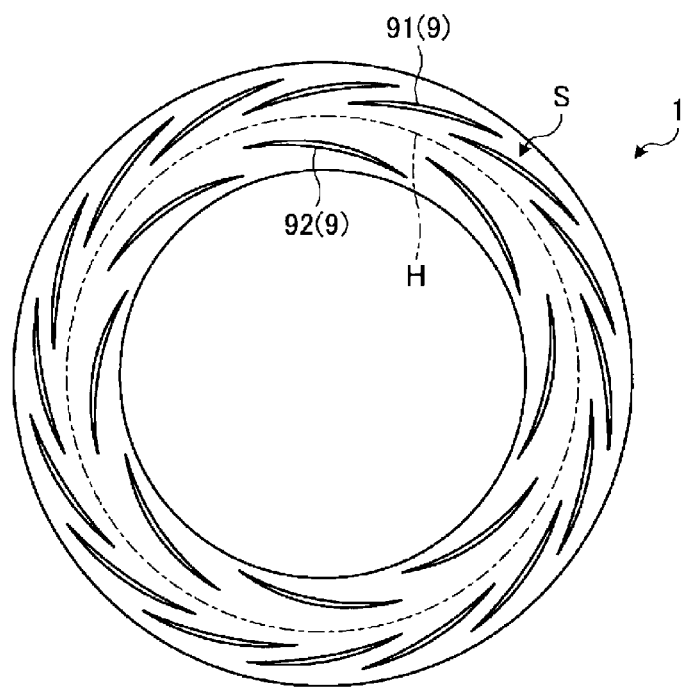
FIG. 7 is a side view of another example of a pneumatic tire according to an embodiment of the present technology.
Figure 8:
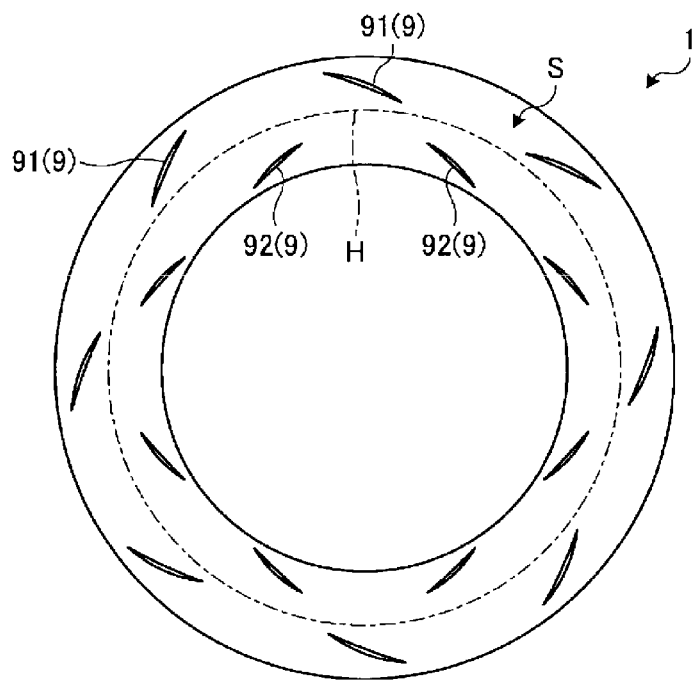
FIG. 8 is a side view of another example of a pneumatic tire according to an embodiment of the present technology.
Figure 9:
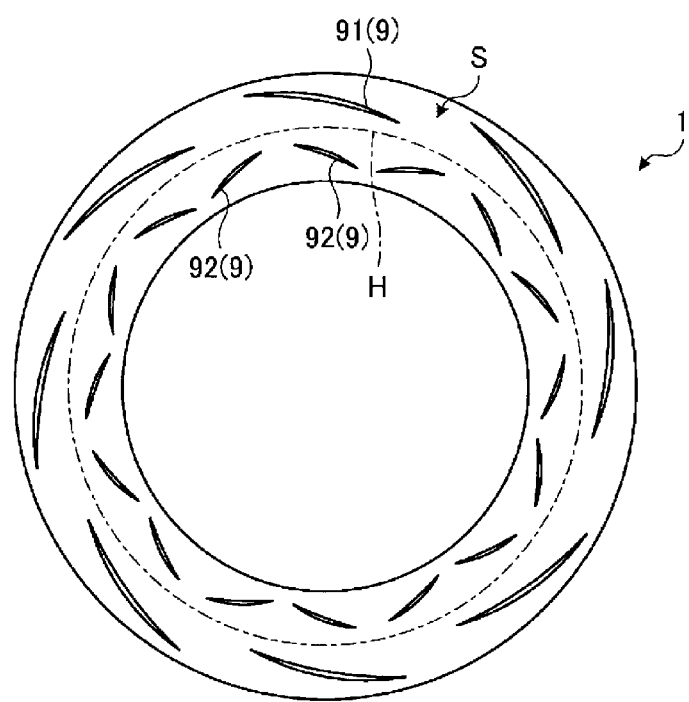
FIG. 9 is a side view of another example of a pneumatic tire according to an embodiment of the present technology.

As illustrated in FIGS. 2, 5, and 6, the radially outer protrusion portions 91 and the radially inner protrusion portions 92 may be arranged having a similar inclination with respect to the tire circumferential direction and the tire radial direction. Alternatively, as illustrated in FIG. 7, the radially outer protrusion portions 91 and the radially inner protrusion portions 92 may have opposite inclinations with respect to the tire circumferential direction and the tire radial direction. Additionally, as illustrated in FIG. 8, the radially outer protrusion portions 91 and the radially inner protrusion portions 92 may each have different inclinations with respect to the tire circumferential direction and the tire radial direction. As illustrated in FIG. 9, the radially outer protrusion portions 91 or the radially inner protrusion portions 92 (the radially inner protrusion portions 92 in FIG. 9) may each have different inclinations with respect to the tire circumferential direction and the tire radial direction. As illustrated in FIGS. 5 and 6, the radially outer protrusion portions 91 and the radially inner protrusion portions 92 may be disposed in the same number in the tire circumferential direction, or as illustrated in FIGS. 2, 7, and 8, may be disposed in different numbers in the tire circumferential direction.

Figure 10:
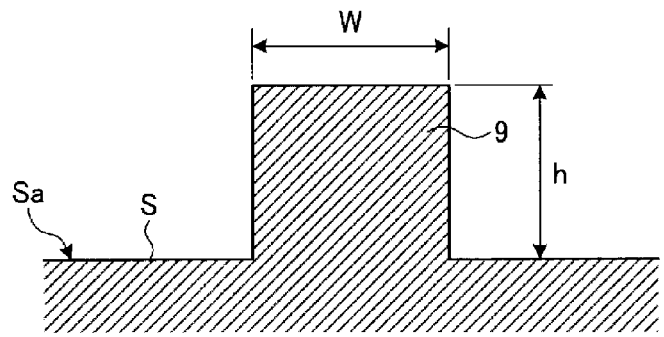
FIG. 10 is a cross-sectional view in the lateral direction of a protrusion portion.

The cross-sectional shape in the lateral direction orthogonal to the extension direction of the protrusion portions 9 (radially outer protrusion portions 91, radially inner protrusion portions 92) may have a quadrangular cross-sectional shape in the lateral direction, as illustrated by the protrusion portion 9 in FIG. 10. The protrusion portion 9 illustrated in FIG. 11 has a triangular cross-sectional shape in the lateral direction. The protrusion portion 9 illustrated in FIG. 12 has a trapezoidal cross-sectional shape in the lateral direction.

Also, the cross-sectional shape in the lateral direction of the protrusion portions 9 may have an external form based on curved lines. The protrusion 9 illustrated in FIG. 13 has a semi-circular cross-sectional shape in the lateral direction.

In addition, while not illustrated in the drawings, the cross-sectional shape in the lateral direction of the protrusion portion 9 may also be a semi-oval shape, a semi-elliptical shape, or any other arcuate shape.

Figure 14:
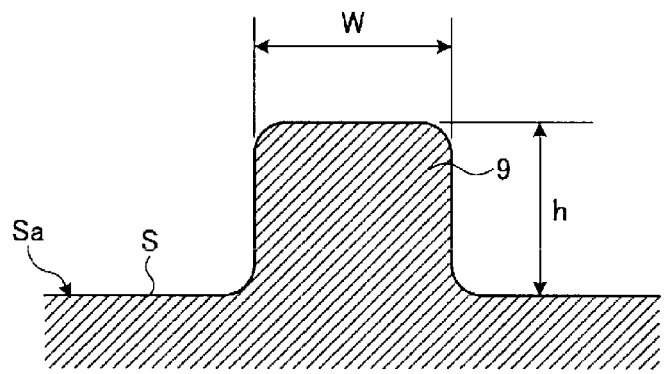
FIG. 14 is a cross-sectional view in the lateral direction of a protrusion portion.
Figure 15:
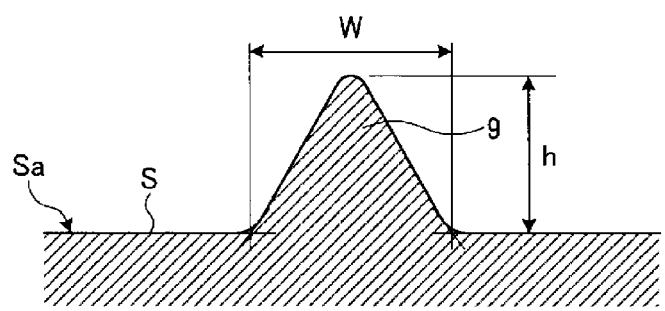
FIG. 15 is a cross-sectional view in the lateral direction of a protrusion portion.
Figure 16:
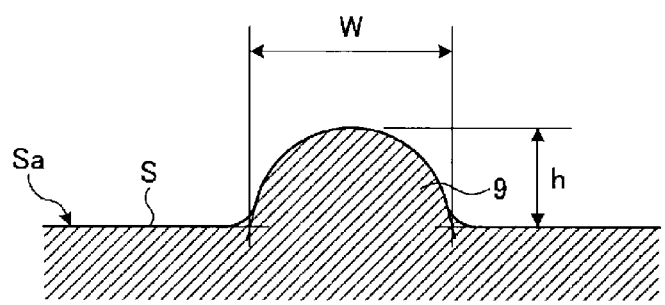
FIG. 16 is a cross-sectional view in the lateral direction of a protrusion portion.
Figure 17:
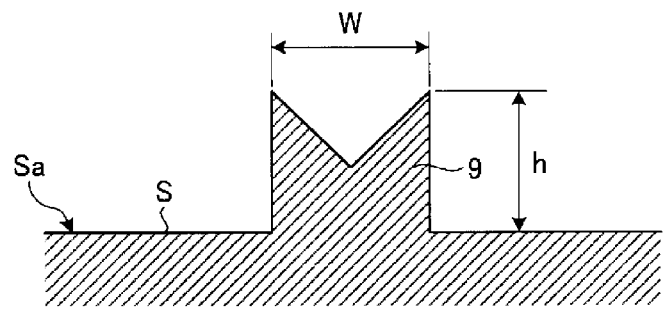
FIG. 17 is a cross-sectional view in the lateral direction of a protrusion portion.
Figure 18:
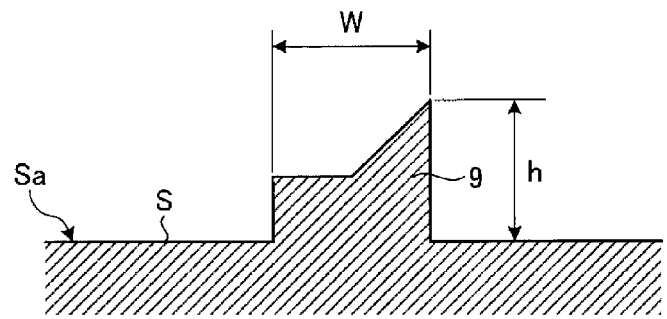
FIG. 18 is a cross-sectional view in the lateral direction of a protrusion portion.
Figure 19:
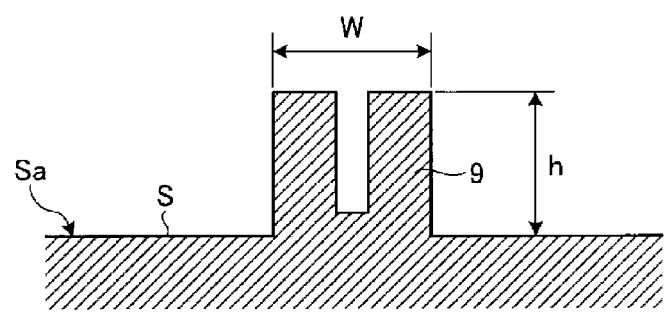
FIG. 19 is a cross-sectional view in the lateral direction of a protrusion portion.
Figure 20:
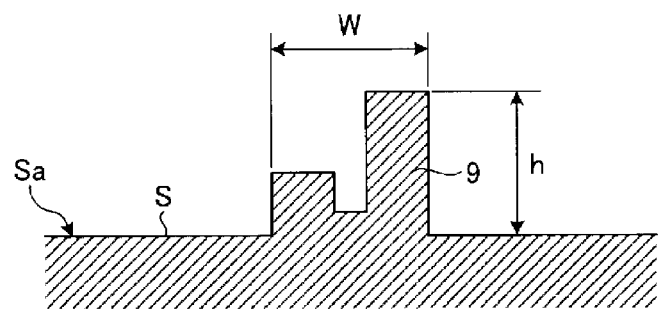
FIG. 20 is a cross-sectional view in the lateral direction of a protrusion portion.
Figure 21:
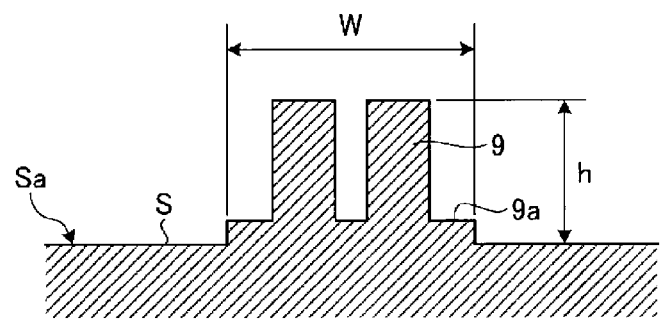
FIG. 21 is a cross-sectional view in the lateral direction of a protrusion portion.

Also, the cross-sectional shape in the lateral direction of the protrusion portion 9 may have an external form that is a combination of straight lines and curves. The protrusion portion 9 illustrated in FIG. 14 has a cross-sectional shape in the lateral direction that is a quadrangular shape with curved corners. The protrusion portion 9 illustrated in FIG. 15 has a cross-sectional shape in the lateral direction that is a triangular shape with curved corners. Also, as illustrated in FIGS. 14 to 16, the cross-sectional shape in the lateral direction of the protrusions 9 may have a shape in which the base portion that projects from the tire side portion S is curved.

Also, the cross-sectional shape in the lateral direction of the protrusion portion 9 may be a combination of shapes. The protrusion portion 9 illustrated in FIG. 17 includes a quadrangular top portion shaped into a zigzag shape by a plurality of triangular shapes (two in FIG. 17). The protrusion portion 9 illustrated in FIG. 18 includes a quadrangular top portion shaped with a point by one triangular shape. The protrusion portion 9 illustrated in FIG. 19 includes a quadrangular top portion shaped into a quadrangular recess. The protrusion portion 9 illustrated in FIG. 20 includes a quadrangular top portion shaped into a quadrangular recess with the projection height on either side of the recess differing. The protrusion portion 9 illustrated in FIG. 21 includes a quadrangular platform portion 9a formed projecting from the tire side portion S. A plurality of quadrangular shapes (two in FIG. 21) are formed on the platform portion 9a in a projecting manner. In addition, while not illustrated in the drawings, the cross-sectional shape in the lateral direction of the protrusion portion 9 may include a quadrangular top portion with a wave-like shape, or have another shape.

Additionally, in the present embodiment, the cross-sectional area of the cross-sectional shape in the lateral direction of the protrusion portion 9 such as that described above is greatest at the highest position hH of the projection height h of the intermediate portion 9A, and the cross-sectional area is small at the lowest positions hL of the projection height h of the tip portions 9B. A width W in the lateral direction may follow the change in the projection height h and be greatest at the highest position hH and smallest at the lowest position hL, or may not change in this manner.

The function of the pneumatic tire 1 is illustrated in FIG. 22. When the pneumatic tire 1 is mounted to a rim 50 and then on a vehicle 100, the pneumatic tire 1 is disposed in a tire housing 101 of the vehicle 100. In this state, when the pneumatic tire 1 rotates in the rotation direction Y1, the vehicle 100 travels in the direction Y2. When the vehicle 100 is traveling, the air flow around the pneumatic tire 1 has low velocity. In response to the slow air flow, an air flow from down to up is created in the tire housing 101. This in turn creates lift, which is a force that raises the vehicle 100 upward. Additionally, in response to the slow air flow, a bulge of air separating from the vehicle 100 is formed outside of the tire housing 101, causing air resistance.

In light of such phenomenon, the pneumatic tire 1 of the present embodiment includes protrusion portions 9 that rotate in the direction Y1 when the vehicle 100 travels. The protrusion portions 9 make the air around the pneumatic tire 1 turbulent and minimize the slow air flow described above. Specifically, at the lower portion of the pneumatic tire 1 when the pneumatic tire 1 is rotating (lower side of a rotation axis P), the speed of the air flowing past the bottom portion of the vehicle 100 is increased. This reduces the air flow from down to up in the tire housing 101, thus suppressing the air pressure upward. As a result, lift can be suppressed. Suppressing lift (lift reducing performance) results in an increase in downforce, an improvement in contact of the pneumatic tire 1 with the ground, and an improvement in steering stability performance, which is a measure of driving performance of the vehicle 100. Additionally, at the upper portion of the pneumatic tire 1 when the pneumatic tire 1 is rotating (upper side of the rotation axis P), a turbulent flow boundary layer is generated. This promotes the air flow around the pneumatic tire 1. As a result, the spread of the passing air is suppressed, so the air resistance of the pneumatic tire 1 can be reduced. Reducing the air resistance leads to an improvement in the fuel economy of the vehicle 100. As illustrated in FIG. 23, this effect can be obtained with the inclination of the protrusion portions 9 being reversed with respect to the tire circumferential direction and the tire radial direction to that of FIG. 22.

Additionally, according to the pneumatic tire 1 of the present embodiment, in the protrusion portion 9, the intermediate portion 9A in the extension direction that intersects the tire circumferential direction and the tire radial direction includes the highest position hH of projection height h from the tire side surface Sa, and the tip portions 9B provided on either side of the intermediate portion 9A in the extension direction each include the lowest position hL of projection height h from the tire side surface Sa. Accordingly, the mass of the protrusion portion 9 is lower at the tip portions 9B. As a result, a sudden change in mass from the tire side surface Sa at the area near the tip portions 9B of the protrusion portion 9 is prevented, improving uniformity in the tire circumferential direction, and in turn improving uniformity.

Additionally, according to the pneumatic tire 1 of the present embodiment, the protrusion portion 9 includes the radially outer protrusion portion 91 with the intermediate portion 9A that includes the highest position hH of projection height h disposed outward of the tire maximum width position H in the tire radial direction and the radially inner protrusion portion 92 with the intermediate portion 9A that includes the highest position hH of projection height h disposed inward of the tire maximum width position H in the tire radial direction. Thus, the air resistance at the tire maximum width position H where the pneumatic tire 1 is widest in the tire lateral direction making the air resistance here also great is reduced. As a result, air resistance is further reduced.

Accordingly, the pneumatic tire 1 of the present embodiment can provide reduced lift and air resistance while maintaining good uniformity.

In the pneumatic tire 1 of the present embodiment, the intermediate portion 9A and the tip portions 9B of the radially outer protrusion portion 91 are preferably disposed outward of the tire maximum width position H in the tire radial direction. In the pneumatic tire 1 of the present embodiment, the intermediate portion 9A and the tip portions 9B of the radially inner protrusion portion 92 are preferably disposed inward of the tire maximum width position H in the tire radial direction.

According to the pneumatic tire 1, by the tip portions 9B being not disposed beyond the tire maximum width position H, the air resistance at the tire maximum width position H where the pneumatic tire 1 is the widest in the tire lateral direction making the air resistance here also great is reduced. As a result, the effect of significantly reducing air resistance can be obtained.

Additionally, as illustrated in FIG. 2, in the pneumatic tire 1 of the present embodiment, the change in mass of the protrusion portion 9 in the tire circumferential direction per 1 degree in the tire circumferential direction sectioned using lines extending from the rotation axis P in the tire radial direction is preferably 0.2 g/degree or less.

According to the pneumatic tire 1, by the change in mass of the protrusion portion 9 in the tire circumferential direction being specified as such, uniformity in the tire circumferential direction is improved. As a result, the effect of significantly improving uniformity can be obtained.

Additionally, in the pneumatic tire 1 of the present embodiment, the intermediate portion 9A of the protrusion portion 9 preferably has a projection height h ranging from 1 mm to 10 mm.

When the projection height h of the intermediate portion 9A is less than 1 mm, the effect of increasing the speed of the air flow past the bottom portion of the vehicle 100 and generating a turbulent flow boundary layer is difficult to obtain. When the projection height h of the intermediate portion 9A is greater than 10 mm, the amount of air flow colliding with the protrusion portion 9 is increased. As a result, air resistance is likely to increase. Thus, to obtain the effect of significantly reducing lift and air resistance, the projection height h of the intermediate portion 9A preferably ranges from 1 mm to 10 mm.

As in the meridian cross-section illustrated in FIG. 1 of the pneumatic tire 1 of the present embodiment when mounted on a regular rim, inflated to the regular internal pressure, and in an unloaded state, the protrusion portion 9 preferably projects outward from a tire cross-sectional width HW at the tire maximum width position H 5 mm or less. In other words, as illustrated in FIG. 24, from a reference line HL extending in the tire radial direction based on the tire maximum width position H of the tire side surface Sa, the projection dimension G of the protrusion portion 9 outward in the tire lateral direction is preferably 5 mm or less.

When the protrusion portion 9 projects outward in the tire lateral direction from the tire cross-sectional width HW at the tire maximum width position H greater than 5 mm, the amount of air flow colliding with the protrusion portion 9 is increased. As a result, the air resistance of the protrusion portion 9 is likely to increase. Thus, by specifying the range in which the protrusion portion 9 projects outward in the tire lateral direction from the tire cross-sectional width HW at the tire maximum width position H, an increase in the air resistance caused by the protrusion portion 9 can be suppressed, and the effect of the protrusion portion 9 significantly improving the slow air flow can be obtained. To significantly obtain these effects, the protrusion portion 9 preferably does not project outward in the tire lateral direction from the tire cross-sectional width HW at the tire maximum width position H, and may project 0 mm or less.

As illustrated in FIGS. 25 to 27, in the pneumatic tire 1 of the present embodiment, a groove 9E is preferably formed in the surface of the protrusion portion 9.

According to the pneumatic tire 1, by the groove 9E being formed, the rigidity of the protrusion portion 9 is decreased. As a result, a decrease in ride comfort due to the tire side portion S being made a rigid structure by the protrusion portions 9 can be suppressed. Additionally, by the groove 9E being formed, the mass of the protrusion portion 9 is decreased. As a result, a decrease in uniformity due to the protrusion portions 9 increasing the mass of the tire side portion S can be suppressed.

Note that as illustrated in FIG. 25, a plurality of the grooves 9E are provided at predetermined intervals with respect to the length L so as to intersect the extension direction of the protrusion portion 9. An angle θ at which the grooves 9E intersect the extension direction of the protrusion portion 9 is not particularly specified. However, the grooves 9E preferably have the same angle θ so that an extreme change in mass of the protrusion portion 9 in the extension direction is suppressed. As illustrated in FIG. 27, the grooves 9E preferably have the same angle θ (for example, θ=90°) with respect to a tangent line GL of a center line SL that passes through the center of the protrusion portion 9 in the lateral direction so that an extreme change in mass of the protrusion portion 9 in the extension direction is suppressed. The grooves 9E preferably have a groove width of 2 mm or less so that they have little aerodynamic influence, that is, their influence on the effect of increasing the air flow past the bottom portion of the vehicle 100 and generating a turbulent flow boundary layer is minimal. As illustrated in FIG. 26, the grooves 9E preferably have a groove depth d1 that is equal to or less than the projection height h of the protrusion portion 9 so that the protrusion portion 9 is not divided partway along the protrusion portion 9, and the effect of increasing the air flow past the bottom portion of the vehicle 100 and generating a turbulent flow boundary layer can be obtained. The groove depth d1 of the grooves 9E is, for example, preferably equal to or less than 90% of the projection height h of the protrusion portion 9. Note that the triangular shape of the protrusion portion 9 as viewed in a cross section in the lateral direction in FIG. 26 is merely an example.

As illustrated in FIGS. 28 and 29, in the pneumatic tire 1 of the present embodiment, a recessed portion 9F is preferably formed in the surface of the protrusion portion 9.

According to the pneumatic tire 1, by the recessed portion 9F being formed, the rigidity of the protrusion portion 9 is decreased. As a result, a decrease in ride comfort due to the tire side portion S being made a rigid structure by the protrusion portions 9 can be suppressed. Additionally, by the recessed portion 9F being formed, the mass of the protrusion portion 9 is decreased. As a result, a decrease in uniformity due to the protrusion portions 9 increasing the mass of the tire side portion S can be suppressed.

Note that as illustrated in FIG. 28, a plurality of the recessed portions 9F are provided at predetermined intervals in the extension direction of the protrusion portion 9. In embodiments in which the width W of the protrusion portion 9 changes in the extension direction, the recessed portions 9F preferably changes in size according to the change in the width W so that an extreme change in mass of the protrusion portion 9 in the extension direction is suppressed. The recessed portions 9F preferably have an opening diameter of 2 mm or less so that they have little aerodynamic influence, that is, their influence on the effect of increasing the air flow past the bottom portion of the vehicle 100 and generating a turbulent flow boundary layer is minimal. As illustrated in FIG. 29, the recessed portions 9F preferably have a groove depth d2 that is equal to or less than the projection height h of the protrusion portion 9 so that the protrusion portion 9 is not divided partway along the protrusion portion 9, and the effect of increasing the air flow past the bottom portion of the vehicle 100 and generating a turbulent flow boundary layer can be obtained. The groove depth d2 of the recessed portions 9F is, for example, preferably equal to or less than 90% of the projection height h of the protrusion portion 9. Note that the triangular shape of the protrusion portion 9 as viewed in a cross section in the lateral direction in FIG. 29 is merely an example. Additionally, the position where the recessed portions 9F are provided is not limited to the top portion of the protrusion portion 9 and may be on a side portion. The opening shape and depth shape of the recessed portion 9F are not limited to a circular shape and may be various shapes. However, the opening edge and the bottom portion are preferably arcuate so that there are no elements prone to generating cracks in the protrusion portion 9.

As illustrated in FIG. 30, in the pneumatic tire 1 of the present embodiment, the grooves 9E and the recessed portions 9F are preferably formed in the surface of the protrusion portion 9.

According to the pneumatic tire 1, by the grooves 9E and the recessed portion 9F being formed, the rigidity of the protrusion portion 9 is decreased. As a result, a decrease in ride comfort due to the tire side portion S being made a rigid structure by the protrusion portions 9 can be suppressed. Additionally, by the grooves 9E and the recessed portion 9F being formed, the mass of the protrusion portion 9 is decreased. As a result, a decrease in uniformity due to the protrusion portions 9 increasing the mass of the tire side portion S can be suppressed.

Note that in FIG. 30, the grooves 9E and the recessed portions 9F are provided alternately in the extension direction of the protrusion portion 9, however, no such limitation is intended and they may be disposed in an appropriate mixed manner.

In the pneumatic tire 1 of the present embodiment, the protrusion portions 9 are preferably disposed at non-uniform intervals in the tire circumferential direction.

According to the pneumatic tire 1, by counteracting the periodicity of the protrusion portions 9 in the tire circumferential direction related to the air flow along the tire side surface Sa of the tire side portion S, the difference in frequency causes the sound pressure generated by the protrusion portions 9 to be dispersed and offset. As a result, noise (sound pressure level) can be reduced.

Note that the intervals of the protrusion portions 9, as viewed from the side of the pneumatic tire 1, are taken as angles between auxiliary lines (not illustrated) of the protrusion portions 9, the auxiliary lines being drawn from the rotation axis P to the ends 9D of the protrusion portions 9 in the tire radial direction. The intervals are intervals in the tire circumferential direction between the radially outer protrusion portions 91, between the radially inner protrusion portions 92, and between the radially outer protrusion portions 91 and the radially inner protrusion portions 92. Additionally, to make the intervals between the protrusion portions 9 non-uniform, a variety of measures can be performed such as having the shape (projection height h, width W, and length L in the extension direction) of the protrusion portions 9 and the inclination at which the protrusion portions 9 intersect the tire circumferential direction and the tire radial direction the same while changing the pitch in the tire circumferential direction; changing the shape (projection height h, width W, and length L in the extension direction); and changing the inclination at which the protrusion portions 9 intersect the tire circumferential direction and the tire radial direction.

Furthermore, the pneumatic tire 1 of the present embodiment preferably has a designated vehicle inner/outer orientation when mounted on a vehicle, and the protrusion portions 9 are preferably formed at least one the tire side portion S corresponding to the vehicle outer side.

In other words, when the pneumatic tire 1 of the present embodiment is mounted on the vehicle 100 (see FIGS. 22 and 23), the orientation with respect to the inner side and the outer side of the vehicle 100 in the tire lateral direction is designated. The orientation designation, while not illustrated in the drawings, for example, can be shown via an indicator provided on the sidewall portion 4. Therefore, the side facing the inner side of the vehicle 100 when mounted on the vehicle 100 is the "vehicle inner side", and the side facing the outer side of the vehicle 100 is the "vehicle outer side". Note that the designations of the vehicle inner side and the vehicle outer side are not limited to cases when mounted on the vehicle 100. For example, in cases in which the pneumatic tire 1 is mounted on a rim, the orientation of the rim 50 (see FIGS. 22 and 23) with respect to the inner side and the outer side of the vehicle 100 in the tire lateral direction is predetermined. Thus, in cases in which the pneumatic tire 1 is mounted on a rim, the orientation with respect to the vehicle inner side and the vehicle outer side in the tire lateral direction is designated.

The tire side portion S on the vehicle outer side is exposed outward from the tire housing 101 when the pneumatic tire 1 is mounted on the vehicle 100. Thus, by the protrusion portions 9 being provided on the tire side portion S on the vehicle outer side, the air flow can be pushed in the vehicle outer side direction. This allows the effect of significantly reducing lift and air resistance to be obtained.

Note that in the pneumatic tire 1 of the embodiment described above, the protrusion portion 9 preferably has the width W in the lateral direction ranging from 0.5 mm to 10.0 mm. When the width W of the protrusion portion 9 in the lateral direction is less than the range described above, the area of the protrusion portion 9 in contact with the air flow is small. This makes the effect of the protrusion portions 9 improving the slow air flow difficult to obtain. When the width W of the protrusion portion 9 in the lateral direction is greater than the range described above, the area of the protrusion portion 9 in contact with the air flow is great. This causes the protrusion portions 9 to increase the air resistance and increase the tire weight. Thus, by appropriately setting the width W of the protrusion portion 9 in the lateral direction, the effect of the protrusion portions 9 significantly improving the slow air flow can be obtained.

Additionally, the pitch of the protrusion portions 9 in the tire circumferential direction may be the same or different from the pitch of lug grooves in the tread portion 2 in the tire circumferential direction. By the pitch of the protrusion portions 9 in the tire circumferential direction being different from the pitch of the lug grooves in the tread portion 2 in the tire circumferential direction, sound pressure generated from the protrusion portions 9 and sound pressure from the lug grooves are dispersed and counteract one another due to the difference in frequency. As a result, pattern noise generated by the lug grooves can be reduced. Note that the lug grooves with a different pitch than the protrusion portions 9 in the tire circumferential direction include all of the lug grooves in the rib-like land portions 23 defined in the tire lateral direction by the main grooves 22. However, to obtain the effect of significantly reducing the pattern noise generated by the lug grooves, the pitch of the protrusion portions 9 in the tire circumferential direction is preferably different from the pitch of the laterally outermost lug grooves disposed nearest the protrusion portions 9.

EXAMPLES

For the examples, tests for lift reducing performance, air resistance reducing performance, uniformity, protrusion portion durability performance, ride comfort performance, and sound pressure level reducing performance were performed on pneumatic tires with various configurations (see FIGS. 31A-31B).

In the tests for lift reducing performance and air resistance reducing performance, a wind tunnel simulation test was run using a vehicle model with tire models having a tire size of 195/65R15 mounted on a body model of a motor assist passenger vehicle.

The travel speed was set to the equivalent of 80 km/h. Using fluid analysis software using Lattice Boltzmann methods utilizing the drag coefficient, the aerodynamic characteristics (lift reducing performance and air resistance reducing performance) were obtained. The evaluation results are expressed as index values based on the obtained results with the results of the conventional example being defined as the reference (100). In the evaluation, larger values indicate superior lift reducing performance and air resistance reducing performance.

In the tests for uniformity, the test tires having a tire size of 195/65R15 were mounted on a regular rim (15×6J) and inflated to the regular internal pressure. Then, the test tire was measured for radial force variation (LFV) in accordance with the method specified in JASO (Japanese Automotive Standards Organization) C607 "Test Procedures for Automobile Tire Uniformity". The evaluation results are expressed as index values based on the measurement results with the result of the conventional example being defined as the reference (100). In the evaluation, larger index scores indicate superior uniformity.

In an indoor drum durability test, the test tires were rotated for a predetermined period of time at a speed of 240 km/h, while monitoring the state of the protrusion portions. The absence of cracks and failure of the protrusion portions are required, with "Pass" indicating the absence of cracks and failure of the protrusion portions, and "Fail" indicating cracks or failure of the protrusion portions.

In the tests for ride comfort performance, the test tires were mounted on the test vehicle, and the test vehicle was driven at 50 km/h on a straight test course with undulations of 10 mm in height, and three members of a panel conducted a feeling test for riding comfort. In the evaluation, the average values of three test results are expressed as index values with the result of the conventional example being defined as the reference (100). In the evaluation, larger index values indicate superior ride comfort performance.

In the tests for sound pressure level reducing performance, the test tires were mounted on the test vehicle, and the sound pressure level of external noise (sound pressure level reducing performance) when the test vehicle was driven at a travel speed equivalent to 80 km/h was measured. The evaluation values are expressed as index values based on the measurement results with the conventional example being defined as the reference (100). In the evaluation, larger index values indicate superior sound pressure level reducing performance.

Figure 32:
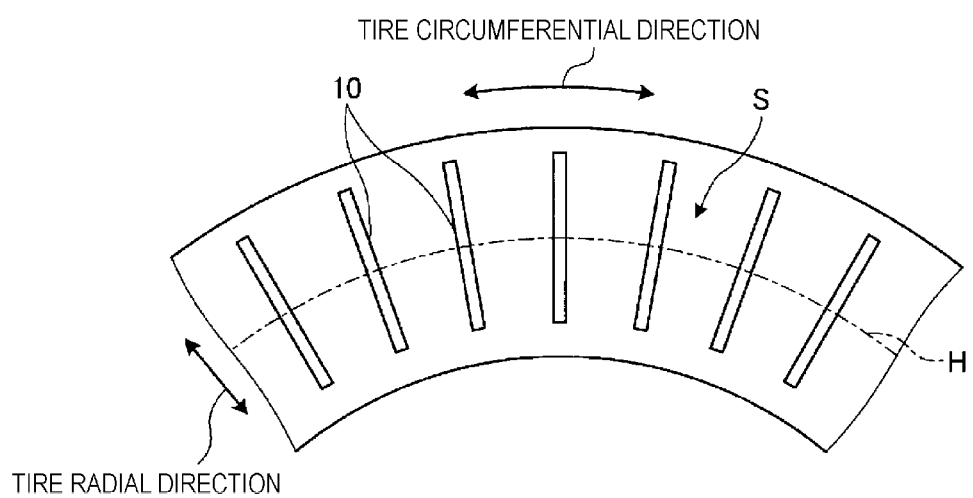
FIG. 32 is a side view of a portion of a pneumatic tire according to the conventional example.

In reference to FIGS. 31A-31B, the pneumatic tire of the conventional example has the configuration illustrated in FIG. 32 and includes a protrusion portion 10 provided on the tire side portion S. The protrusion portion 10 has the triangular shape as viewed in a cross section in the lateral direction illustrated in FIG. 11, extends in the tire radial direction, has uniform projection height and width in the lateral direction in the extension direction, disposed in a direction that intersects the tire maximum width position H, and is disposed at equal intervals in the tire circumferential direction.

Figure 11:
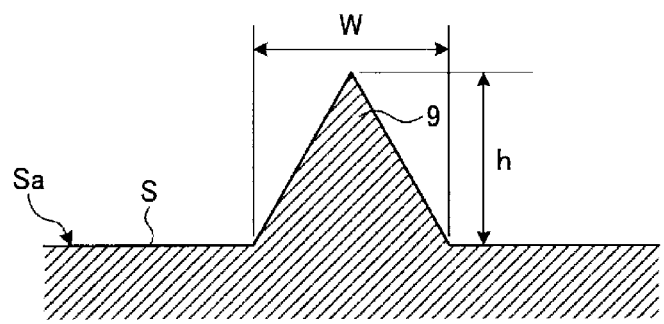
FIG. 11 is a cross-sectional view in the lateral direction of a protrusion portion.
Figure 12:
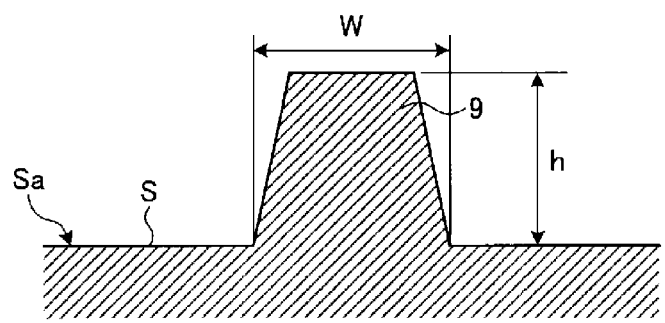
FIG. 12 is a cross-sectional view in the lateral direction of a protrusion portion.
Figure 13:
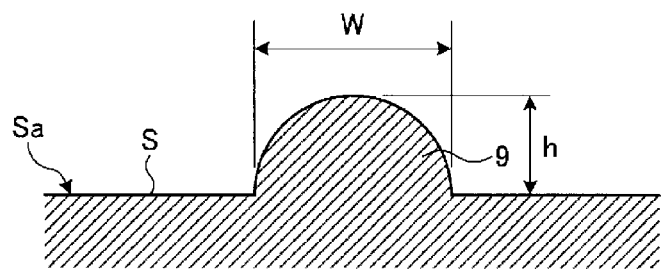
FIG. 13 is a cross-sectional view in the lateral direction of a protrusion portion.

Also in reference to FIGS. 31A-31B, the pneumatic tires of Examples 1 to 13 have the configuration illustrated in FIG. 2 and include the radially outer protrusion portion and the radially inner protrusion portion illustrated in FIG. 4 with a triangular shape as viewed in a cross section in the lateral direction of the protrusion portion illustrated in FIG. 11. The pneumatic tire of Example 14 has the configuration illustrated in FIG. 5 and includes the radially outer protrusion portion and the radially inner protrusion portion illustrated in FIG. 4 with a triangular shape as viewed in a cross section in the lateral direction of the protrusion portion illustrated in FIG. 11. The pneumatic tire of Example 15 has the configuration illustrated in FIG. 6 and includes the radially outer protrusion portion and the radially inner protrusion portion illustrated in FIG. 4 with a triangular shape as viewed in a cross section in the lateral direction of the protrusion portion illustrated in FIG. 11. In other aspects, the Examples are specified as appropriate.

As seen in the test results of FIGS. 31A-31B, the pneumatic tires of the Examples have superior lift reducing performance, air resistance reducing performance, uniformity, protrusion portion durability performance, ride comfort performance, and sound pressure level reducing performance.

The invention claimed is:

1. A pneumatic tire, comprising:
a plurality of protrusion portions extending along a tire side surface of a tire side portion in a curving direction that intersects a tire circumferential direction and a tire radial direction when viewed in plan view;
the plurality of protrusion portions each including
an intermediate portion in an extension direction that includes a highest position of projection height from the tire side surface, the intermediate portion being defined as a portion in a range of 25% of a length of the protrusion portion in the extension direction from a center on either side in the extension direction, and
tip portions on either side of the intermediate portion in the extension direction that include a lowest position of projection height from the tire side surface, the tip portions extending from the intermediate portion on both sides in the extension direction excluding 5% of the length of the protrusion portion from ends of the protrusion portion in the extension direction; and
the plurality of protrusion portions including
a radially outer protrusion portion with at least the intermediate portion disposed outward of a tire maximum width position in the tire radial direction, and
a radially inner protrusion portion with at least the intermediate portion disposed inward of the tire maximum width position in the tire radial direction; wherein
the lowest position at the tip portion is at a position 5% of the length of the protrusion portion from the ends of the protrusion portion;
the projection height of the protrusion portion at the lowest position is smaller than the projection height of the protrusion portion at the highest position; and
a width in a lateral direction at the highest position is greatest, and a width in the lateral direction at the lowest position is smaller than the width in the lateral direction at the highest position.

2. The pneumatic tire according to claim 1, wherein the intermediate portion and the tip portions of the radially outer protrusion portion are disposed outward of the tire maximum width position in the tire radial direction.

3. The pneumatic tire according to claim 2, wherein the intermediate portion and the tip portions of the radially inner protrusion portion are disposed inward of the tire maximum width position in the tire radial direction.

4. The pneumatic tire according to claim 3, wherein a change in mass of the protrusion portion in the tire circumferential direction per 1 degree in the tire circumferential direction is 0.2 g/degree or less.

5. The pneumatic tire according to claim 4, wherein the intermediate portion of the protrusion portion has a projection height ranging from 1 mm to 10 mm.

6. The pneumatic tire according to claim 5, wherein when the pneumatic tire is mounted on a regular rim, inflated to a regular internal pressure, in an unloaded state, and viewed in a meridian cross-section, the protrusion portion projects outward 5 mm or less in a tire lateral direction from a tire cross-sectional width at the tire maximum width position.

7. The pneumatic tire according to claim 6, wherein a groove is formed on a surface of the protrusion portion.

8. The pneumatic tire according to claim 7, wherein a recessed portion is formed on the surface of the protrusion portion.

9. The pneumatic tire according to claim 8, wherein the plurality of protrusion portions are disposed in the tire circumferential direction at non-uniform intervals.

10. The pneumatic tire according to claim 9, wherein a vehicle inner/outer orientation when the pneumatic tire is mounted on a vehicle is designated, and the plurality of protrusion portions are at least formed on a tire side portion that corresponds to a vehicle outer side.

11. The pneumatic tire according to claim 1, wherein the intermediate portion and the tip portions of the radially inner protrusion portion are disposed inward of the tire maximum width position in the tire radial direction.

12. The pneumatic tire according to claim 1, wherein the intermediate portion of the protrusion portion has a projection height ranging from 1 mm to 10 mm.

13. The pneumatic tire according to claim 1, wherein when the pneumatic tire is mounted on a regular rim, inflated to a regular internal pressure, in an unloaded state, and viewed in a meridian cross-section, the protrusion portion projects outward 5 mm or less in a tire lateral direction from a tire cross-sectional width at the tire maximum width position.

14. The pneumatic tire according to claim 1, wherein a groove is formed on a surface of the protrusion portion.

15. The pneumatic tire according to claim 1, wherein a recessed portion is formed on the surface of the protrusion portion.

16. The pneumatic tire according to claim 1, wherein the plurality of protrusion portions are disposed in the tire circumferential direction at non-uniform intervals.

17. The pneumatic tire according to claim 1, wherein a vehicle inner/outer orientation when the pneumatic tire is mounted on a vehicle is designated, and the plurality of protrusion portions are at least formed on a tire side portion that corresponds to a vehicle outer side.

18. The pneumatic tire according to claim 1, wherein a cross-sectional area in a lateral direction of the protrusion portion is greatest at the highest position of the projection height of the intermediate portion, and a cross-sectional area is smallest at the lowest positions of the projection height of the tip portions.

19. The pneumatic tire according to claim 1, wherein the projection height of the protrusion portion in the extension direction gradually increases from one of the ends of toward the center and gradually decreases from the center toward the other of the ends.

20. The pneumatic tire according to claim 1, wherein the protrusion portion is formed in a S-shape.

21. The pneumatic tire according to claim 1, wherein the protrusion portion curves in a C-shape when viewed in the plan view, and the intermediate portion and both of the tip portions respectively incline in the tire circumferential direction.

22. The pneumatic tire according to claim 1, wherein the intermediate portion of the radially outer protrusion portion and the intermediate portion of the radially inner protrusion portion overlap each other when viewed in the tire radial direction, and the intermediate portions of the adjacent radially inner protrusion portion do not overlap each other when viewed in the tire radial direction.

23. The pneumatic tire according to claim 1, wherein the intermediate portion and both of the tip portions of the radially outer protrusion portion are arranged outside the tire radial direction from the tire maximum width position, and the intermediate portion and both of the tip portions of the radially inner protrusion portion are arranged inward the tire radial direction from the tire maximum width position.

24. The pneumatic tire according to claim 1, wherein all the radially outer protrusion portions are arranged having a similar inclination with respect to the tire circumferential direction.

25. The pneumatic tire according to claim 1, wherein all the radially inner protrusion portions are arranged having a similar inclination with respect to the tire circumferential direction.

26. The pneumatic tire according to claim 1, wherein all the radially outer protrusion portions and all the radially inner protrusion portions are arranged having a similar inclination with respect to the tire circumferential direction.

27. The pneumatic tire according to claim 1, wherein all the radially outer protrusion portions and all the radially inner protrusion portions are arranged having opposite inclinations with respect to the tire circumferential direction.

28. The pneumatic tire according to claim 1, wherein a length of the radially outer protrusion portion is longer than a length of radially inner protrusion portion.

29. The pneumatic tire according to claim 1, wherein a length of the radially outer protrusion portion is shorter than a length of radially inner protrusion portion.

30. The pneumatic tire according to claim 1, wherein a change in mass of the protrusion portion in the tire circumferential direction per 1 degree in the tire circumferential direction is 0.2 g/degree or less.

31. The pneumatic tire according to claim 1, wherein the protrusion portions have a triangular cross-sectional shape in the lateral direction.

32. A pneumatic tire, comprising:
a plurality of protrusion portions extending along a tire side surface of a tire side portion in a curving direction that intersects a tire circumferential direction and a tire radial direction when viewed in plan view;
the plurality of protrusion portions each including
an intermediate portion in an extension direction that includes a highest position of projection height from the tire side surface, the intermediate portion being defined as a portion in a range of 25% of a length of the protrusion portion in the extension direction from a center on either side in the extension direction, and
tip portions on either side of the intermediate portion in the extension direction that include a lowest position of projection height from the tire side surface, the tip portions extending from the intermediate portion on both sides in the extension direction excluding 5% of the length of the protrusion portion from ends of the protrusion portion in the extension direction; and the plurality of protrusion portions including
- a radially outer protrusion portion with at least the intermediate portion disposed outward of a tire maximum width position in the tire radial direction, and
- a radially inner protrusion portion with at least the intermediate portion disposed inward of the tire maximum width position in the tire radial direction; wherein the lowest position at the tip portion is at a position 5% of the length of the protrusion portion from the ends of the protrusion portion;

the projection height of the protrusion portion at the lowest position is smaller than the projection height of the protrusion portion at the highest position; and the protrusion portion extends from the highest position to the lowest position and has an arc shape that is convex to the tire outside when viewed from a side of the protrusion portion.

33. The pneumatic tire according to claim 32, wherein the protrusion portions have a triangular cross-sectional shape in a tire lateral direction.

\* \* \* \* \*